United States Patent
Moon et al.

(10) Patent No.: US 6,805,464 B2
(45) Date of Patent: Oct. 19, 2004

(54) DIRECT-TYPE BACK LIGHT DEVICE

(75) Inventors: Jeong Min Moon, Kyonggi-do (KR); Ju Young Bang, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 67 days.

(21) Appl. No.: 10/180,464

(22) Filed: Jun. 27, 2002

(65) Prior Publication Data

US 2003/0086261 A1 May 8, 2003

(30) Foreign Application Priority Data

Nov. 5, 2001 (KR) .......................... P2001-68567

(51) Int. Cl.[7] .............................................. F21V 11/00
(52) U.S. Cl. ...................... 362/235; 362/249; 362/240; 362/225
(58) Field of Search ................... 362/225, 260, 362/249, 235

(56) References Cited

U.S. PATENT DOCUMENTS

| 4,184,194 | A | * | 1/1980 | Shofi ........................ 362/97 |
|---|---|---|---|---|
| 5,720,546 | A | * | 2/1998 | Correll, Jr. et al. ......... 362/221 |
| 6,126,297 | A | * | 10/2000 | Matsui et al. ............... 362/231 |
| 6,331,064 | B1 | * | 12/2001 | Nishiyama et al. ......... 362/260 |
| 6,467,933 | B2 | * | 10/2002 | Baar .......................... 362/260 |
| 6,491,411 | B2 | * | 12/2002 | Itoh ............................ 362/246 |
| 6,527,414 | B2 | * | 3/2003 | Moon .......................... 362/249 |

* cited by examiner

*Primary Examiner*—Sandra O'Shea
*Assistant Examiner*—Anabel Ton
(74) *Attorney, Agent, or Firm*—Morgan, Lewis & Bockius LLP

(57) ABSTRACT

A direct type back light device includes a plurality of luminescent lamps, each having first and second opposite ends, first and second lower supports separated at a constant interval corresponding to a length of each of the luminescent lamps, the first and second lower supports each have a plurality of grooves for receiving one of the first and second opposite ends of the luminescent lamps to fix and support the luminescent lamps in parallel and conductive layers for supplying power to the luminescent lamps, and first and second upper supports formed to oppose the first and second lower supports, each of the first and second upper supports having grooves and conductive layers corresponding to the grooves and conductive layers of the first and second lower supports.

31 Claims, 32 Drawing Sheets

DIRECT-TYPE BACK LIGHT DEVICE

The present invention claims the benefit of the Korean Application No. P2001-68567 filed in Korea on Nov. 5, 2001, which is hereby incorporated by reference.

BACKGROUND OF THE INVENTION

1. Field of the Invention

The present invention relates to a back light device, and more particularly, to a direct-type back light device for a liquid crystal display (LCD) device.

2. Discussion of the Related Art

In general, ultra thin sized flat panel displays having a display screen with a thickness of several centimeters or less, and in particular, flat panel LCD devices, are commonly used as monitors for notebook computers, spacecraft, and aircraft. A passive luminescent LCD includes a back light device provided at a rear of an LCD panel and is commonly used as a light source. However, the back light device is inefficient due to its weight, power consumption, and overall thickness. The back light device used as a light source of an LCD is commonly formed as a plurality of cylindrical fluorescent lamps arranged along a first direction and spaced apart from each other along a second direction perpendicular to the first direction.

The back light device may be defined as one of two distinct categories including a direct-type back light device and a light guiding plate-type back light device. In the direct-type back light device, a fluorescent lamp is arranged on a flat panel, and is spaced from the LCD panel, thereby preventing a shape of the fluorescent lamp to be displayed on a LCD panel. In addition, a light-scattering means is necessary in order to provide uniform light distribution for the LCD panel. Accordingly, an overall size of the LCD device will be increased because of the requirements of the direct-type back light device. Moreover, with the development of large-sized LCD panels, a light-emitting area of the back light device increases. Accordingly, a light-scattering means should be provided having a sufficient thickness to ensure that the light-emitting area is flat.

In the light guiding plate-type back light device, a fluorescent lamp is provided at one side of a light guiding plate such that light is dispersed onto an entire surface of the LCD panel. However, since the fluorescent lamp is provided to pass through the one side of the light guiding plate, low luminance of the LCD panel arises. Accordingly, advanced optical design and processing technologies are necessary to ensure uniform distribution of luminous intensity of the fluorescent lamp.

The direct-type back light device and the light guiding plate-type back light device are problematic for each of there unique shortcomings. For example, the direct-type back light device is commonly used for LCD devices, such as monitors for personal computers or televisions, where brightness is considered more important than overall thickness of the type of back light device. The light guiding plate-type back light device is commonly used for LCD devices, such as notebook computers, where overall thickness of the type of back light device is important.

FIG. 1 is a perspective view of a direct-type back light device according to the related art, and FIG. 2 is a perspective view of a connector according to the related art. In FIG. 1, the direct-type back light device includes a plurality of luminescent lamps 1, an outer case 3 that fixes and supports the luminescent lamps 1, and light-scattering sheets 5a, 5b and 5c arranged between the luminescent lamps 1 and an LCD panel (not shown).

Each of the luminescent lamps 1 are commonly referred to as cold cathode fluorescent lamps (CCFL's), and act as a light source of an LCD device. The opposite ends of the luminescent lamp 1 are fit into grooves formed at both sides of the outer case 3.

The outer case 3 includes a reflecting plate 7 formed on an innermost side, and is arranged to focus light emitted from each of the luminescent lamps 1 onto a display part of the LCD panel (not shown), thereby enhancing light efficiency.

The light scattering sheets 5a, 5b, and 5c prevent an image of the luminescent lamps 1 from being displayed onto a display screen of the LCD panel (not shown) and provide uniform distribution of the emitted light from the luminescent lamps 1. In addition, the light scattering sheets 5a, 5b, and 5c may include a plurality of diffusion sheets and plates, thereby enhancing a light scattering effect.

In FIG. 2, each of the luminescent lamps 1 includes electrodes 2a and 2b arranged at opposite ends of the lamp 1. The luminescent lamps 1 emit light when a power source is supplied to the electrodes 2a and 2b via power lines 9a and 9b, respectively. The power lines 9a and 9b are connected to a connector 11, and the connector 11 is connected to a driving circuit (not shown). Accordingly, each luminescent lamp 1 requires a separate connector 11. In addition, one of the power lines 9a and 9b is curved downward toward the outer case 3 and is connected to the connector 11.

However, the direct-type back light device according to the related art is problematic. For example, since the connector 11 is connected to the power lines 9a and 9b of the luminescent lamp 1, a separate connector 11 is required for each luminescent lamp 1. Accordingly, a total number of power lines 9a and 9b and connectors 11 may lead to complicated fabricating processes. Working efficiency of the direct-type back light device deteriorates since one of the power lines 9a and 9b is bent to reduce the total thickness of the back light device. In addition, manufacturing time increases and productivity deteriorates since separate fabrication processes are required.

In addition, a hole is formed to pass through the outer case so that the electrode is connected with the connector. Both electrodes of the luminescent lamp are fitted into the hole so that they are exposed outside the outer case. For this reason, efficiency of the manufacturing process is reduced and it is not easy to repair and maintain the luminescent lamp.

SUMMARY OF THE INVENTION

Accordingly, the present invention is directed to a direct-type back light device that substantially obviates one or more problems due to limitations and disadvantages of the related art.

An object of the present invention is to provide a direct-type back light device having uniform luminance.

Another object of the present invention is to provide a direct-type back light device that facilitates maintenance, replacement and repair.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a direct type back light device includes a plurality of luminescent lamps, each having first and second opposite ends, first and second lower supports separated at a constant interval corresponding to a length of each of the luminescent lamps, the first and second lower supports each have a plurality of grooves for receiving one of the first and second opposite ends of the luminescent lamps to fix and support the luminescent lamps in parallel and conductive layers for supplying power to the luminescent lamps, and first and second upper supports formed to oppose the first and second lower supports, each of the first and second upper supports having grooves and conductive layers corresponding to the grooves and conductive layers of the first and second lower supports.

In another aspect, a direct-type back light device includes a plurality of luminescent lamps, each having first and second opposite ends, first and second lower supports separated at a constant interval corresponding to a length of the luminescent lamps, the first and second lower supports each have a first plurality of grooves for receiving one of the first and second opposite ends of the luminescent lamps to fix and support the luminescent lamps, a lower holder formed between the first and second lower supports to fix and support the first and second lower supports, first and second upper supports formed to oppose the first and second lower supports, each of the first and second upper supports arranged at the constant interval to fix and support the luminescent lamps together with the first and second lower supports and each of the first and second upper supports have inclined interior surfaces and a second plurality of grooves, and conductive layers formed on surfaces of the first and second pluralities of grooves to apply a power source to each of the luminescent lamps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
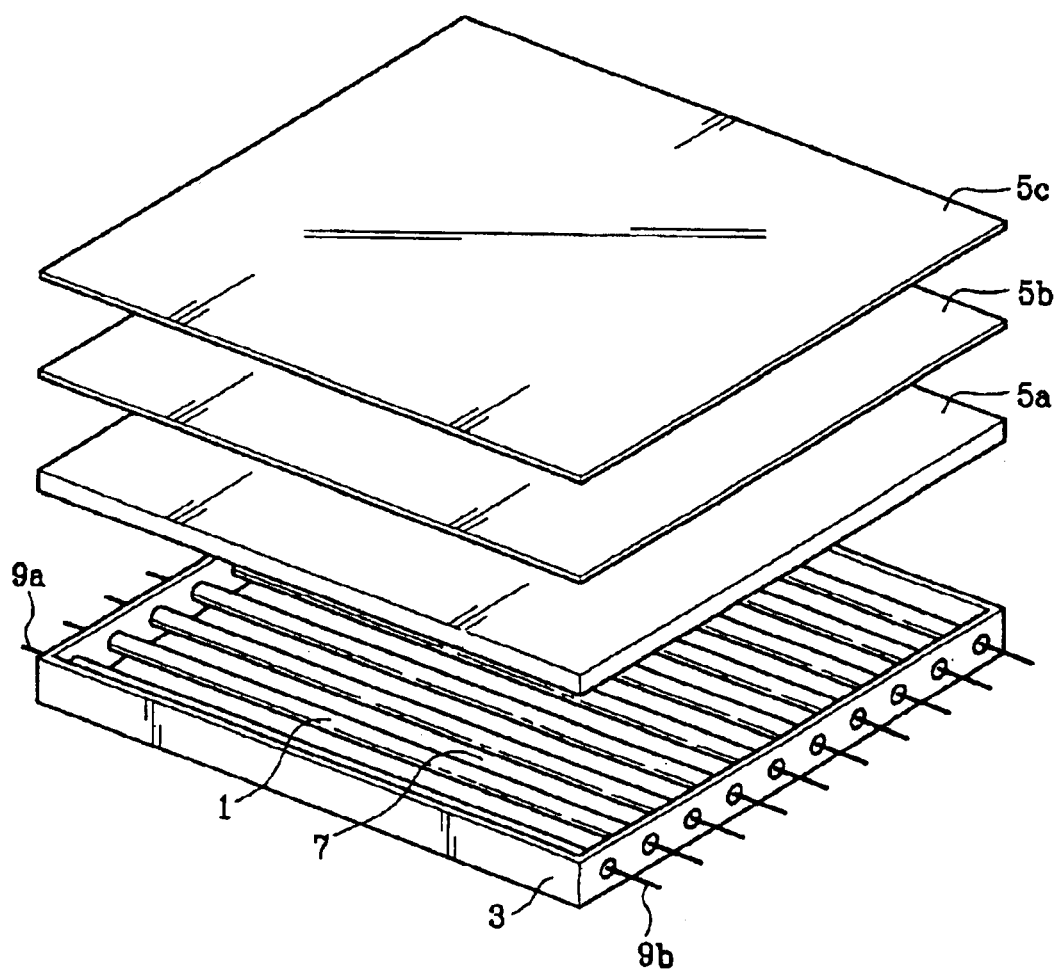
FIG. 1 is a perspective view of a direct-type back light device according to the related art.
Figure 2:
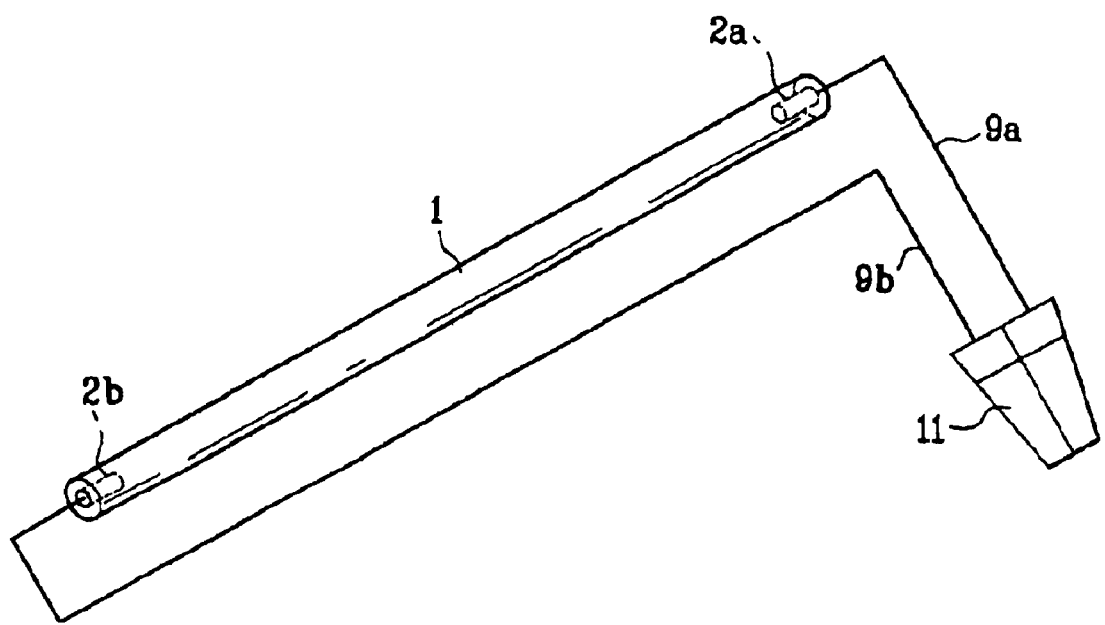
FIG. 2 is a perspective view of a connector according to the related art.
Figure 3A:
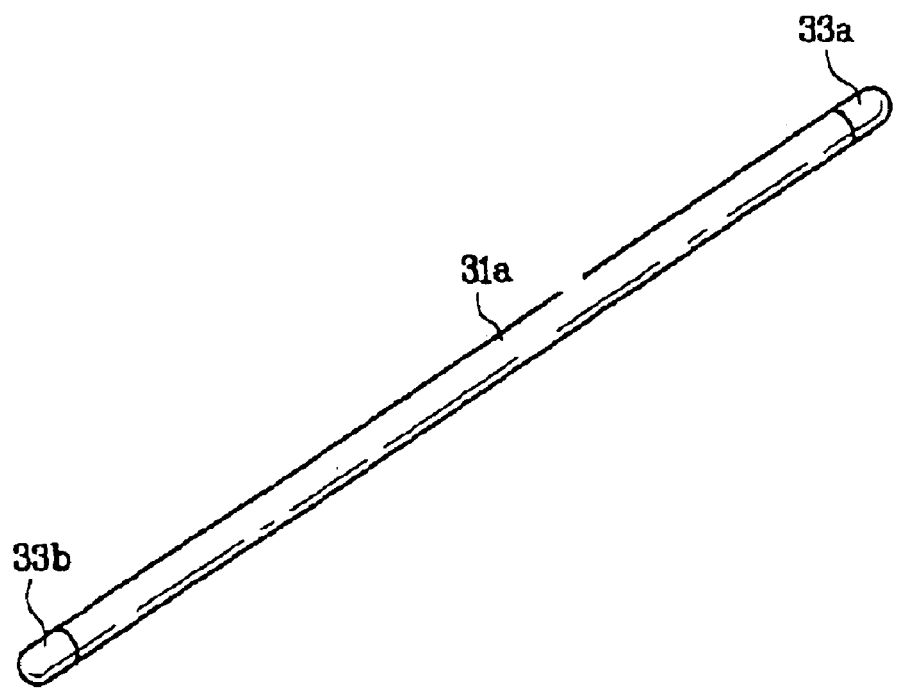
FIGS. 3A and 3B are perspective views exemplary luminescent lamps according to the present invention.
Figure 3B:
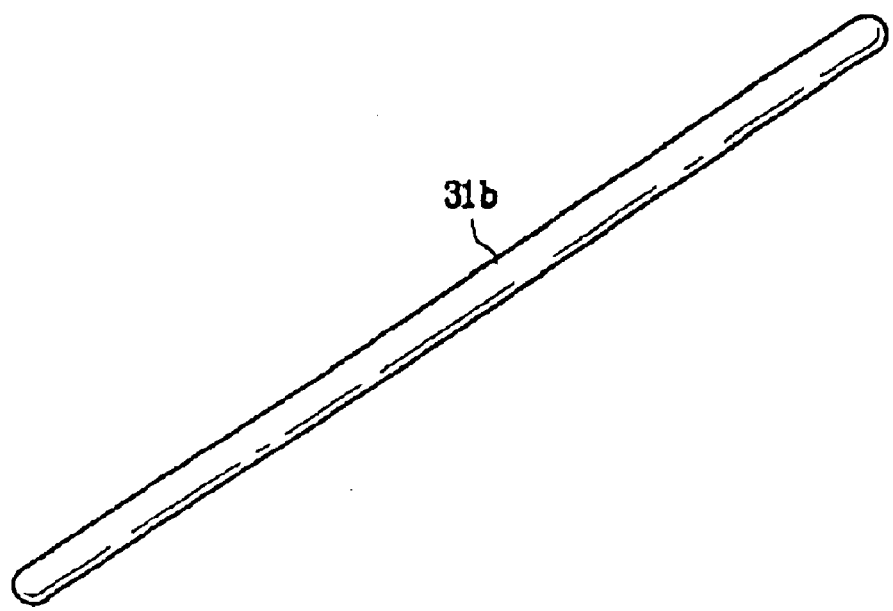

FIGS. 3A and 3B are perspective views of exemplary luminescent lamps according to the present invention. In FIG. 3A, a luminescent lamp 31a may include electrodes 33a and 33b formed at opposite ends on outside surfaces of the luminescent lamp 31a. In FIG. 3B, a luminescent lamp 31b may include electrodes (not shown) formed at opposite ends inside of the luminescent lamp 31b. Although the following embodiments may be shown to include the luminescent lamp 31b of FIG. 3B, the luminescent lamp 31a of FIG. 3A may be also incorporated.

Figure 4A:
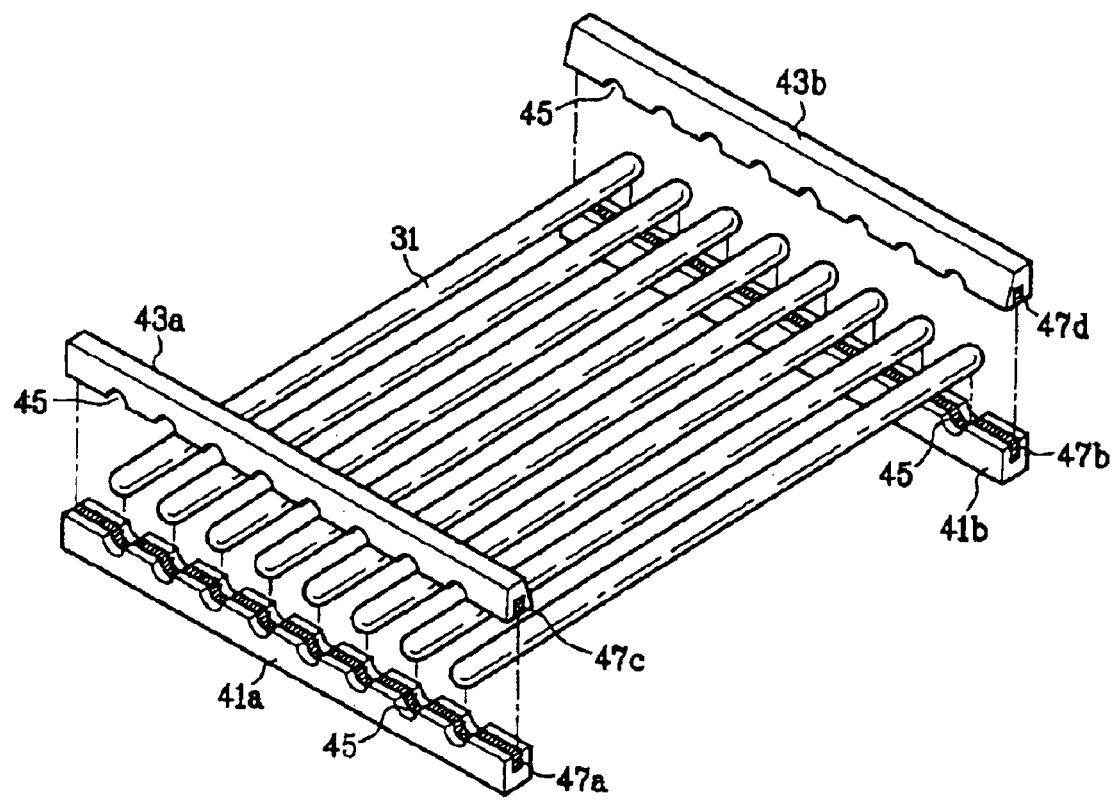
FIGS. 4A, 4B, and 4C are perspective and cross-sectional views of an exemplary direct-type back light device according to the present invention.
Figure 4B:
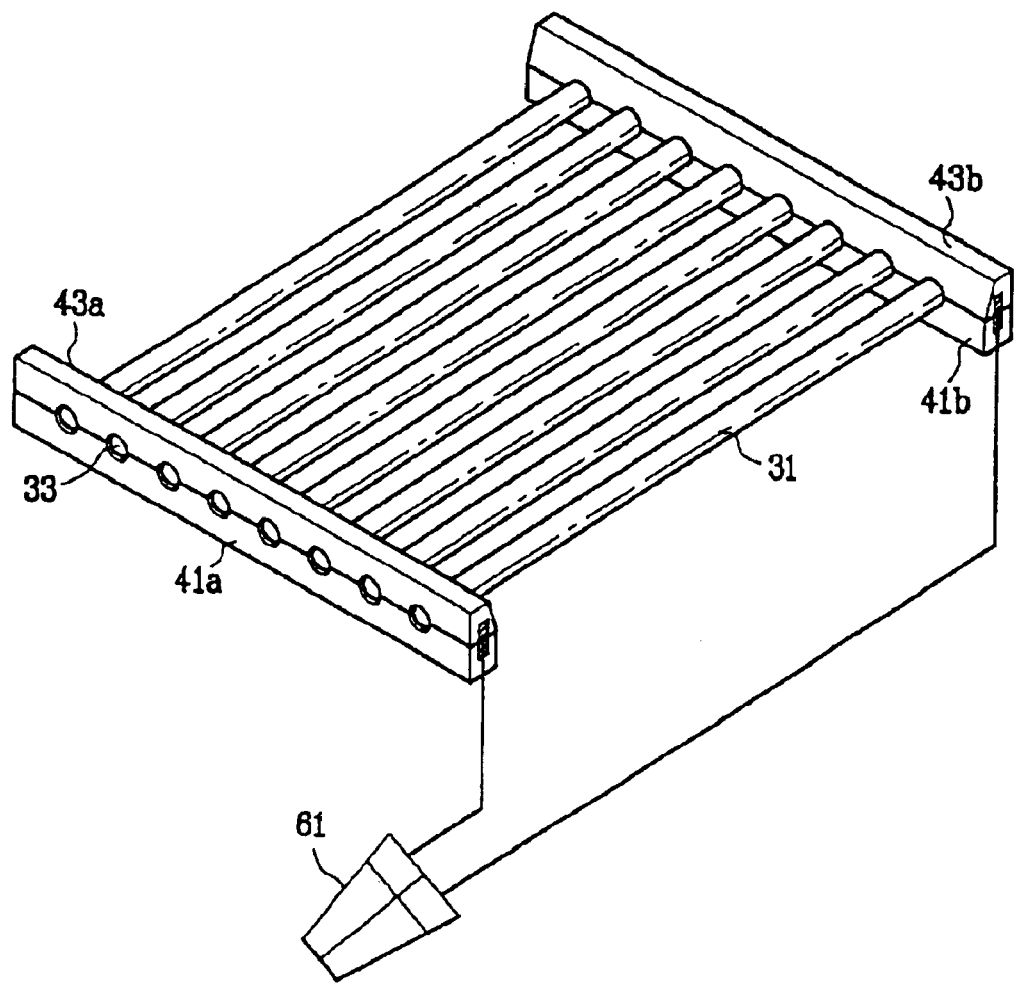
Figure 4C:
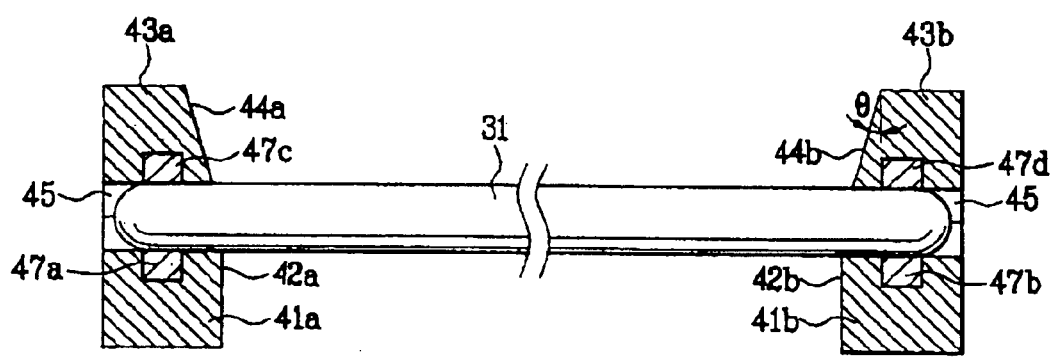

FIGS. 4A, 4B, and 4C are perspective and cross-sectional views of an exemplary direct-type back light device according to the present invention. In FIG. 4A, the direct-type back light device may include a plurality of luminescent lamps 31, a first lower support 41a, a second lower support 41b, a first upper support 43a corresponding to the first lower support 41a, and a second upper support 43b corresponding to the second lower support 41b. Each of the plurality of luminescent lamps 31 may include electrodes formed inside the luminescent lamps 31 at opposite ends (not shown), and may be arranged in parallel along a first direction, which is corresponds to a length direction of the luminescent lamps 31, and spaced apart from each other by a first interval along a second direction perpendicular to the first direction. Alternatively, the luminescent lamps 31 may include electrodes (not shown) formed along outside surfaces of the luminescent lamps 31 at opposite ends of the luminescent lamps 31.

The first lower support 41a and the second lower support 41b may be spaced apart from each other along the first direction by a constant interval that corresponds to a length of the luminescent lamps 31. In addition, the first and second lower supports 41a and 41b may include grooves 45 for receiving first portions of the opposite ends of the luminescent lamps 31. The first and second upper supports 43a and 43b may include grooves 45 for receiving second portions of the opposite ends of the luminescent lamps 31. Accordingly, the first and second lower supports 41a and 41b and the first and second upper supports 43a and 43b may secure the opposite ends of each of the luminescent lamps 31. The grooves 45 may be formed to completely pass through each of the first and second lower and upper supports 41a, 41b, 43a, and 43b so that the opposite ends of the luminescent lamps 31 extend through the first and second lower and upper supports 41a, 41b, 43a, and 43b, thereby constraining each of the luminescent lamps 31 along the second direction. In addition, each groove 45 of the first and second lower supports 41a and 41b and the first and second upper supports 43a and 43b may have a depth corresponding to a radius of the luminescent lamps 31.

The first lower support 41a may include a conductive layer 47a formed within a trench along a length direction of the first lower support 41a. The second lower support 41b may include a conductive layer 47b formed within a trench along a length direction of the second lower support 41b. The first upper support 43a may include a conductive layer 47c formed within a trench along a length direction of the first upper support 43a. The second upper support 43b may include a conductive layer 47d formed within a trench along a length direction of the second upper support 43b. The conductive layers 47a, 47b, 47c, and 47d supply power to the electrodes of the luminescent lamps 31. Alternatively, the conductive layers 47a and 47b may be formed as an electrically conductive coating upon uppermost surfaces of the first and second lower supports 41a and 41b along the length directions, and the conductive layers 47c and 47d may be formed as an electrically conductive coating upon lowermost surfaces of the first and second upper supports 43a and 43b along the length directions. Accordingly, the electrically conductive coatings formed on the uppermost and lowermost surfaces of the first and second lower and upper supports 41a, 41b, 43a, and 43b may extend along side surfaces of the first and second lower and upper supports 41a, 41b, 43a, and 43b in order to make electrical contact to the connector 61, as shown in FIG. 4B.

In FIG. 4B, since the luminescent lamps 31 may be connected with a driving circuit (not shown) through one connector connected with the conductive layers 47a, 47b, 47c and 47d (in FIG. 4A), a total number of connectors may be significantly reduced. Accordingly, a connection line between the luminescent lamps 31 and the driving circuit (not shown) may be simplified, thereby improving manufacturing efficiency.

In FIG. 4C, the first lower support 41a may include a first surface 42a that is normal to a surface of the luminescent lamp 31, and the second lower support 41b may include a second surface 42b that is also normal to the surface of the luminescent lamp 31. The first upper support 43a may include a first inclined surface 44a, and the second upper support 43b may include a second inclined surface 44b. The first and second surfaces 44a and 44b may be inclined with respect to a line normal to a surface of the luminescent lamps 31 by an angle θ that is within a range of about 10° to 30°. Accordingly, a thickness of the first and second upper supports 43a and 43b along the first direction may be less than a thickness of the first and second lower supports 41a and 41b along the first direction. Thus, a luminescent area of the plurality of luminescent lamps 31 may be increased at a region corresponding to end portions of the luminescent lamps 31.

In addition, a light scattering system (not shown) that may include a diffusion sheet and a diffusion plate, for example, may scatter light emitted from the luminescent lamps 31. Accordingly, the light scattering system (not shown) may be arranged above the first and second upper supports 43a and 43b so that the scattered light is uniformly distributed upon a display portion of an LCD panel.

Figure 5A:
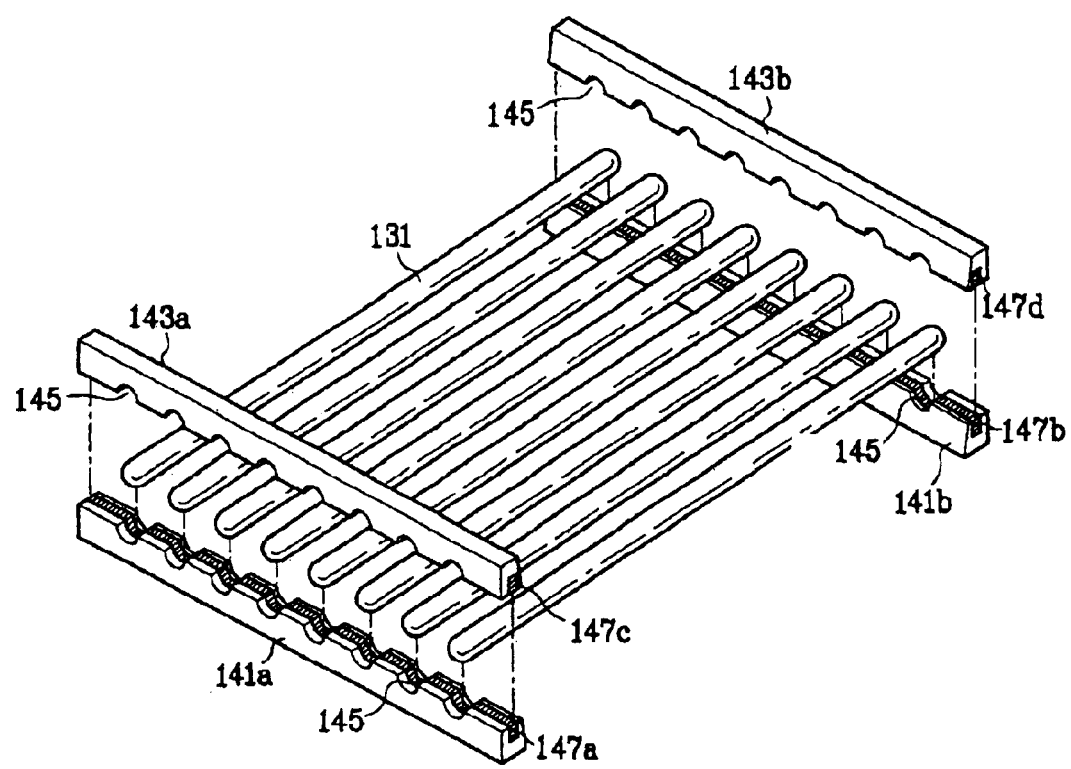
FIGS. 5A, 5B, and 5C are perspective and cross-sectional views of another exemplary direct-type back light device according to the present invention.
Figure 5B:
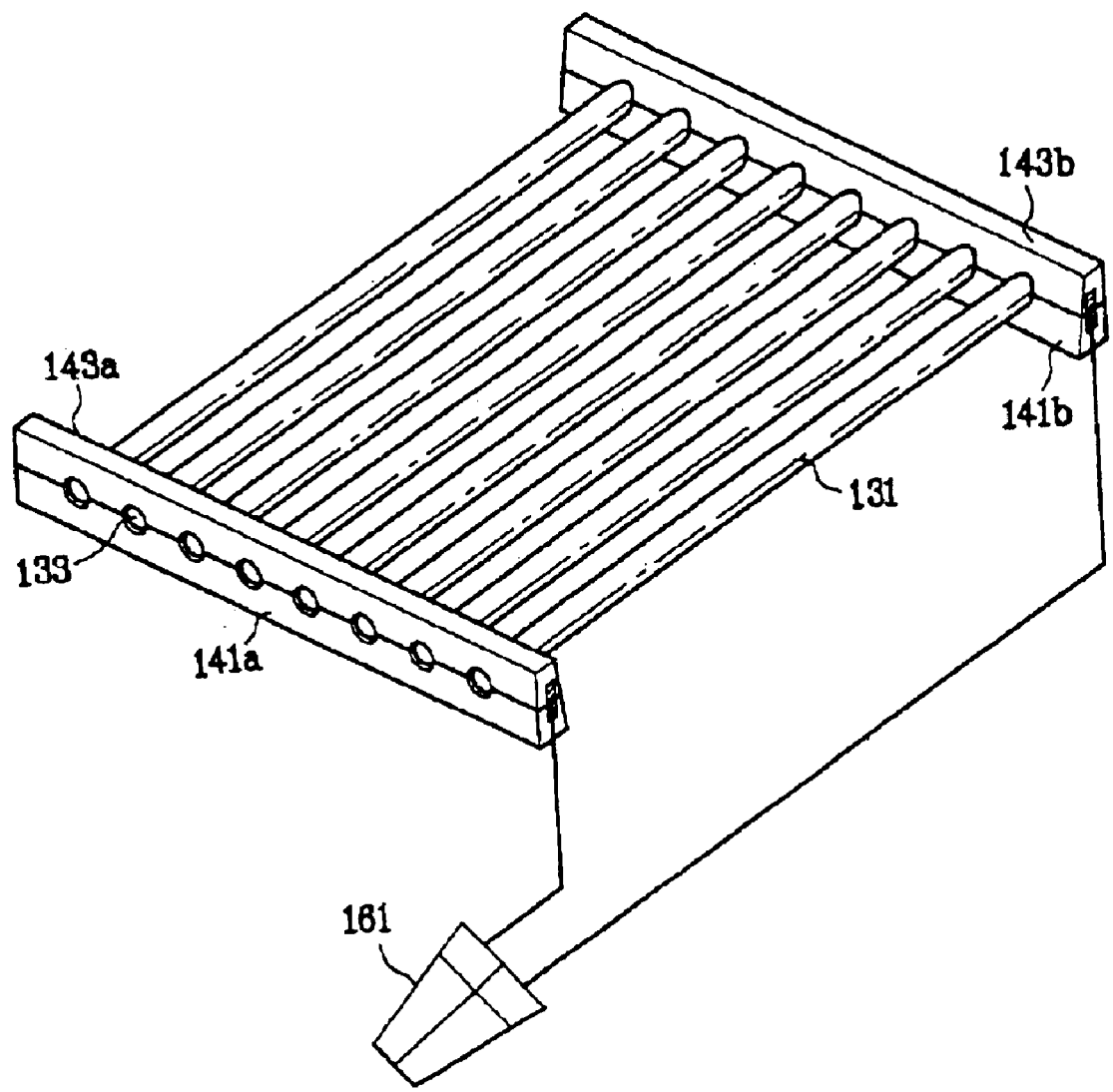
Figure 5C:
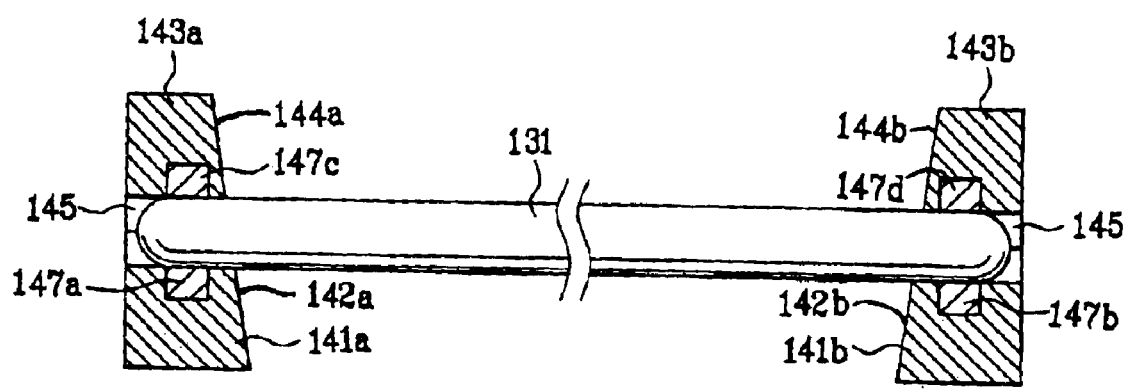

FIGS. 5A, 5B, and 5C are perspective and cross-sectional views of another exemplary direct-type back light device according to the present invention. In FIG. 5A, the direct-type back light device may include a plurality of luminescent lamps 131, a first lower support 141a, a second lower support 141b, a first upper support 143a corresponding to the first lower support 141a, and a second upper support 143b corresponding to the second lower support 141b. Each of the plurality of luminescent lamps 131 may include electrodes (not shown) formed inside the luminescent lamps 131 at opposite ends, and may be arranged in parallel along a first direction, which corresponds to a length direction of the luminescent lamps 131, and spaced apart from each other by a first interval along a second direction perpendicular to the first direction. Alternatively, the luminescent lamps 131 may include electrodes (not shown) formed along outside surfaces of the luminescent lamps 131 at opposite ends of the luminescent lamps 131.

The first lower support 141a and the second lower support 141b may be spaced apart from each other along the first direction by a constant interval that corresponds to a length of the luminescent lamps 131. In addition, the first and second lower supports 141a and 141b may include grooves 145 for receiving first portions of the opposite ends of the luminescent lamps 131. The first and second upper supports 143a and 143b may include grooves 145 for receiving second portions of the opposite ends of the luminescent lamps 131. Accordingly, the first and second lower supports 141a and 141b and the first and second upper supports 143a and 143b may secure the opposite ends of each of the luminescent lamps 131. The grooves 145 may be formed to completely pass through each of the first and second lower and upper supports 141a, 141b, 143a, and 143b so that the opposite ends of the luminescent lamps 131 extend through the first and second lower and upper supports 141a, 141b, 143a, and 143b, thereby constraining each of the luminescent lamps 131 along the second direction. In addition, each groove 145 of the first and second lower supports 141a and 141b and the first and second upper supports 143a and 143b may have a depth corresponding to a radius of the luminescent lamps 131.

The first lower support 141a may include a conductive layer 147a formed within a trench along a length direction of the first lower support 141a. The second lower support 141b may include a conductive layer 147b formed within a trench along a length direction of the second lower support 141b. The first upper support 143a may include a conductive layer 147c formed within a trench along a length direction of the first upper support 143a. The second upper support 143b may include a conductive layer 147d formed within a trench along a length direction of the second upper support 143b. The conductive layers 147a, 147b, 147c, and 147d supply power to the electrodes of the luminescent lamps 131. Alternatively, the conductive layers 147a and 147b may be formed as an electrically conductive coating upon uppermost surfaces of the first and second lower supports 141a and 141b along the length directions, and the conductive layers 147c and 147d may be formed as an electrically conductive coating upon lowermost surfaces of the first and second upper supports 143a and 143b along the length directions. Accordingly, the electrically conductive coatings formed on the uppermost and lowermost surfaces of the first and second lower and upper supports 141a, 141b, 143a, and 143b may extend along side surfaces of the first and second lower and upper supports 141a, 141b, 143a, and 143b in order to make electrical contact to the connector 161 (in FIG. 5B).

In FIG. 5B, since the luminescent lamps 131 may be connected with a driving circuit (not shown) through one connector connected with the conductive layers 147a, 147b, 147c and 147d, a total number of the connectors 161 may be significantly reduced. Accordingly, a connection line between the luminescent lamps 131 and the driving circuit (not shown) may be simplified, thereby improving manufacturing efficiency.

In FIG. 5C, the first lower support 141a may include a first inclined surface 142a, and the second lower support 141b may include a second inclined surface 142b. The first upper support 143a may include a first inclined surface 144a, and the second upper support 143b may include a second inclined surface 144b. The first and second inclined surfaces 142a and 142b of the first and second lower supports 141a and 141b, and the first and second inclined surfaces 144a and 144b of the first and second upper supports 143a and 143b may be inclined with respect to lines normal to surfaces of the luminescent lamps 131 by an angle θ that is within a range of about 10° to 30°. Accordingly, an uppermost thickness of the first and second upper supports 143a and 143b along the first direction may be less than an uppermost thickness of the first and second lower supports 141a and 141b along the first direction. Thus, a luminescent area of the plurality of luminescent lamps 131 may be further increased at a region corresponding to end portions of the luminescent lamps 131.

In addition, a light scattering system (not shown) that may include a diffusion sheet and a diffusion plate, for example, may scatter light emitted from the luminescent lamps 131. Accordingly, the light scattering system (not shown) may be arranged above the first and second upper supports 143a and 143b so that the scattered light is uniformly distributed upon a display portion of an LCD panel.

Figure 6A:
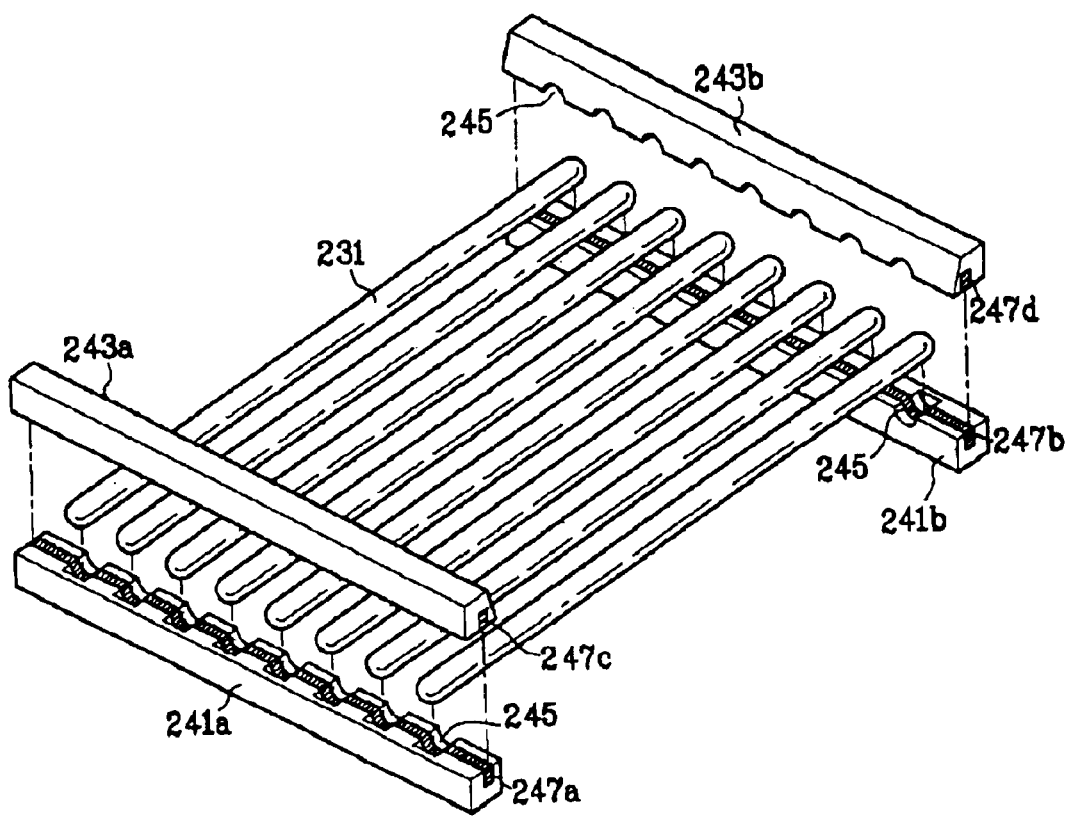
FIGS. 6A, 6B, and 6C are perspective and cross-sectional views of another exemplary direct-type back light device according to the present invention.
Figure 6B:
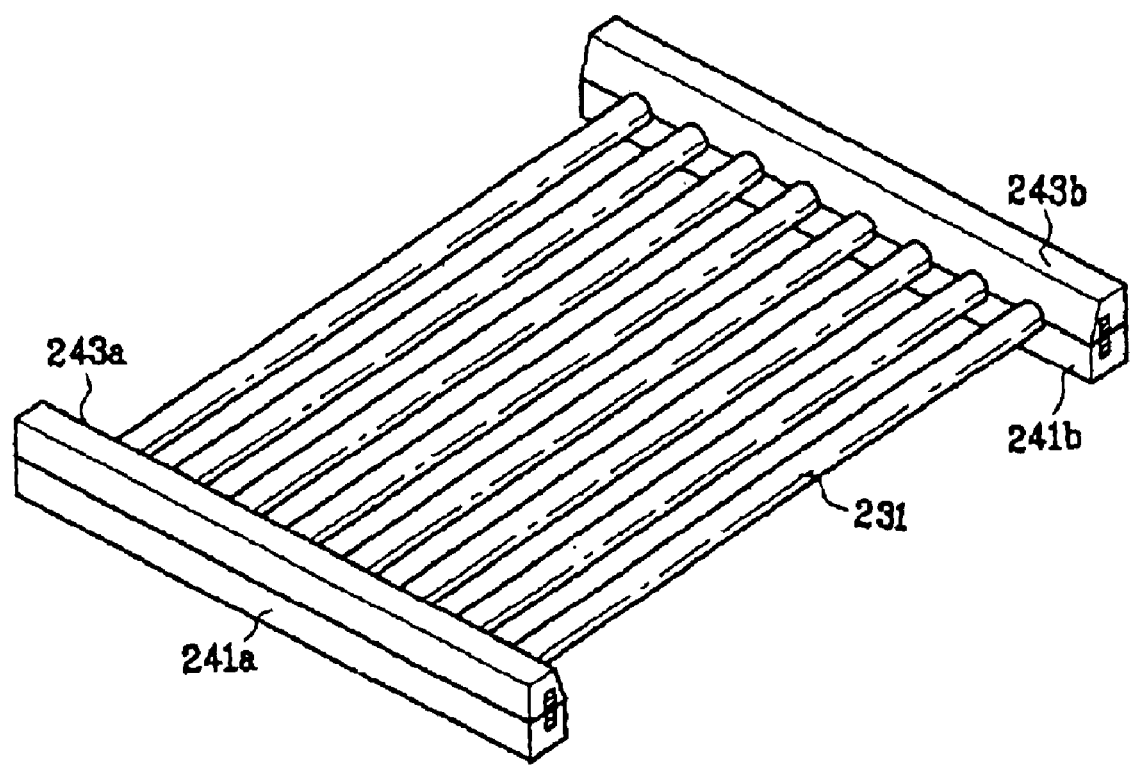
Figure 6C:
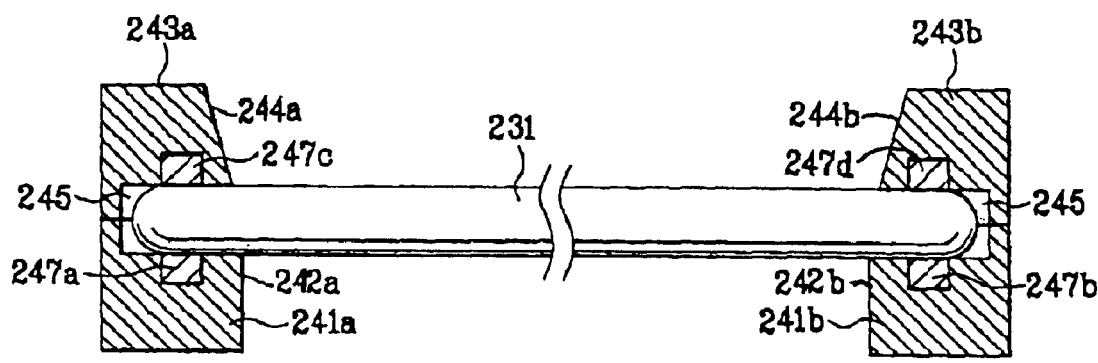

FIGS. 6A, 6B, and 6C are perspective and cross-sectional views of another exemplary direct-type back light device according to the present invention. In FIG. 6A, the direct-type back light device may include a plurality of luminescent lamps 231, a first lower support 241a, a second lower support 241b, a first upper support 243a corresponding to the first lower support 241a, and a second upper support 243b corresponding to the second lower support 241b. Each of the plurality of luminescent lamps 231 may include electrodes (not shown) formed inside the luminescent lamps 231 at opposite ends, and may be arranged in parallel along a first direction, which corresponds to a length direction of the luminescent lamps 231, and spaced apart from each other by a first interval along a second direction perpendicular to the first direction. Alternatively, the luminescent lamps 231 may include electrodes (not shown) formed along outside surfaces of the luminescent lamps 231 at opposite ends of the luminescent lamps 231.

The first lower support 241a and the second lower support 241b may be spaced apart from each other along the first direction by a constant interval that corresponds to a length of the luminescent lamps 231. In addition, the first and second lower supports 241a and 241b may include grooves 245 for receiving first portions of the opposite ends of the luminescent lamps 231. The first and second upper supports 243a and 243b may include grooves 245 for receiving second portions of the opposite ends of the luminescent lamps 231. Accordingly, the first and second lower supports 241a and 241b and the first and second upper supports 243a and 243b may secure the opposite ends of each of the luminescent lamps 231. The grooves 245 may be formed to partially pass through each of the first and second lower and upper supports 241a, 241b, 243a, and 243b so that the opposite ends of the luminescent lamps 231 do not extend through the first and second lower and upper supports 241a, 241b, 243a, and 243b, thereby constraining each of the luminescent lamps 231 along the first and second directions. In addition, each groove 245 of the first and second lower supports 241a and 241b and the first and second upper supports 243a and 243b may have a depth corresponding to a radius of the luminescent lamps 231.

The first lower support 241a may include a conductive layer 247a formed within a trench along a length direction of the first lower support 241a. The second lower support 241b may include a conductive layer 247b formed within a trench along a length direction of the second lower support 241b. The first upper support 243a may include a conductive layer 247c formed within a trench along a length direction of the first upper support 243a. The second upper support 243b may include a conductive layer 247d formed within a trench along a length direction of the second upper support 243b. The conductive layers 247a, 247b, 247c, and 247d supply power to the electrodes of the luminescent lamps 231. Alternatively, the conductive layers 247a and 247b may be formed as an electrically conductive coating upon uppermost surfaces of the first and second lower supports 241a and 241b along the length directions, and the conductive layers 247c and 247d may be formed as an electrically conductive coating upon lowermost surfaces of the first and second upper supports 243a and 243b along the length directions. Accordingly, the electrically conductive coatings formed on the uppermost and lowermost surfaces of the first and second lower and upper supports 241a, 241b, 243a, and 243b may extend along side surfaces of the first and second lower and upper supports 241a, 241b, 243a, and 243b in order to make electrical contact to a connector (not shown).

In FIG. 6B, since the luminescent lamps 231 may be connected with a driving circuit (not shown) through one connector connected with the conductive layers 247a, 247b, 247c and 247d, a total number of the connectors may be significantly reduced. Accordingly, a connection line between the luminescent lamps 231 and the driving circuit (not shown) may be simplified, thereby improving manufacturing efficiency.

In FIG. 6C, the first lower support 241a may include a first surface 242a that is normal to a surface of the luminescent lamp 231, and the second lower support 241b may include a second surface 242b that is also normal to the surface of the luminescent lamp 231. The first upper support 243a may include a first inclined surface 244a, and the second upper support 243b may include a second inclined surface 244b. The first and second surfaces 244a and 244b may be inclined with respect to a line normal to a surface of the luminescent lamps 231 by an angle θ that is within a range of about 10° to 30°. Accordingly, a thickness of the first and second upper supports 243a and 243b along the first direction may be less than a thickness of the first and second lower supports 241a and 241b along the first direction. Thus, a luminescent area of the plurality of luminescent lamps 231 may be increased at a region corresponding to end portions of the luminescent lamps 231.

In addition, a light scattering system (not shown) that may include a diffusion sheet and a diffusion plate, for example, may scatter light emitted from the luminescent lamps 231. Accordingly, the light scattering system (not shown) may be arranged above the first and second upper supports 243a and 243b so that the scattered light is uniformly distributed upon a display portion of an LCD panel.

Figure 7A:
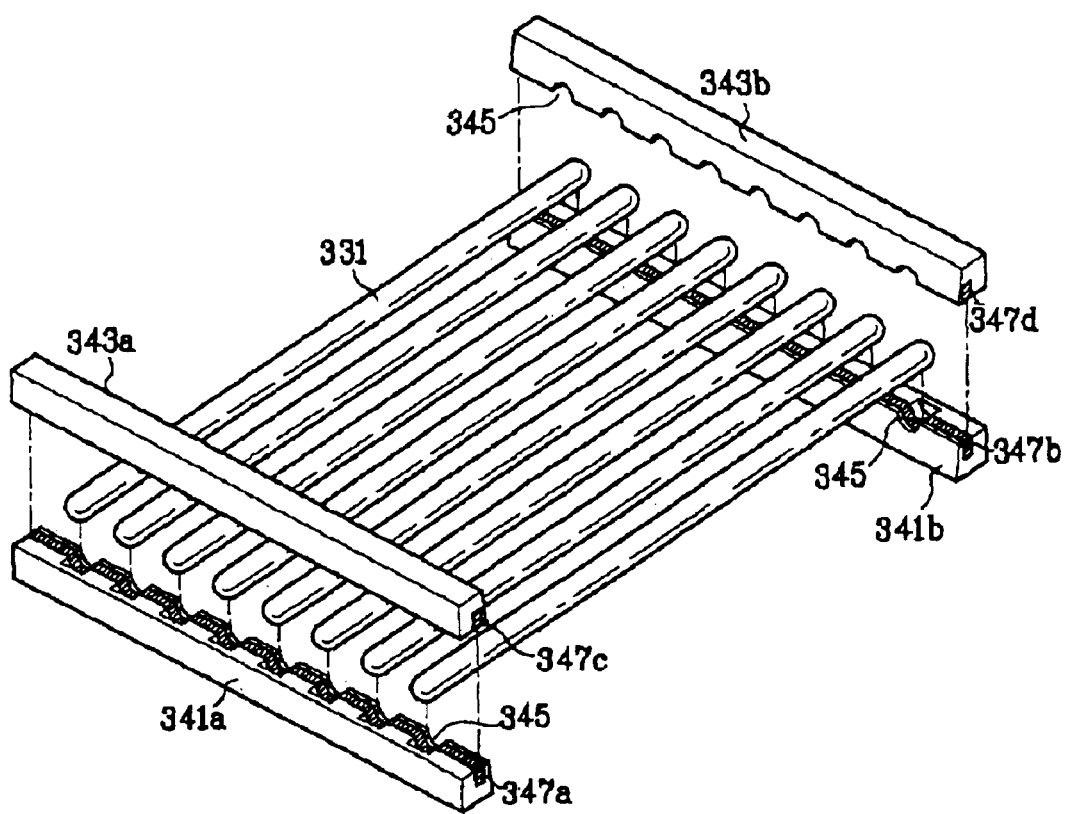
FIGS. 7A, 7B, and 7C are perspective and cross-sectional views of another exemplary direct-type back light device according to the present invention.
Figure 7B:
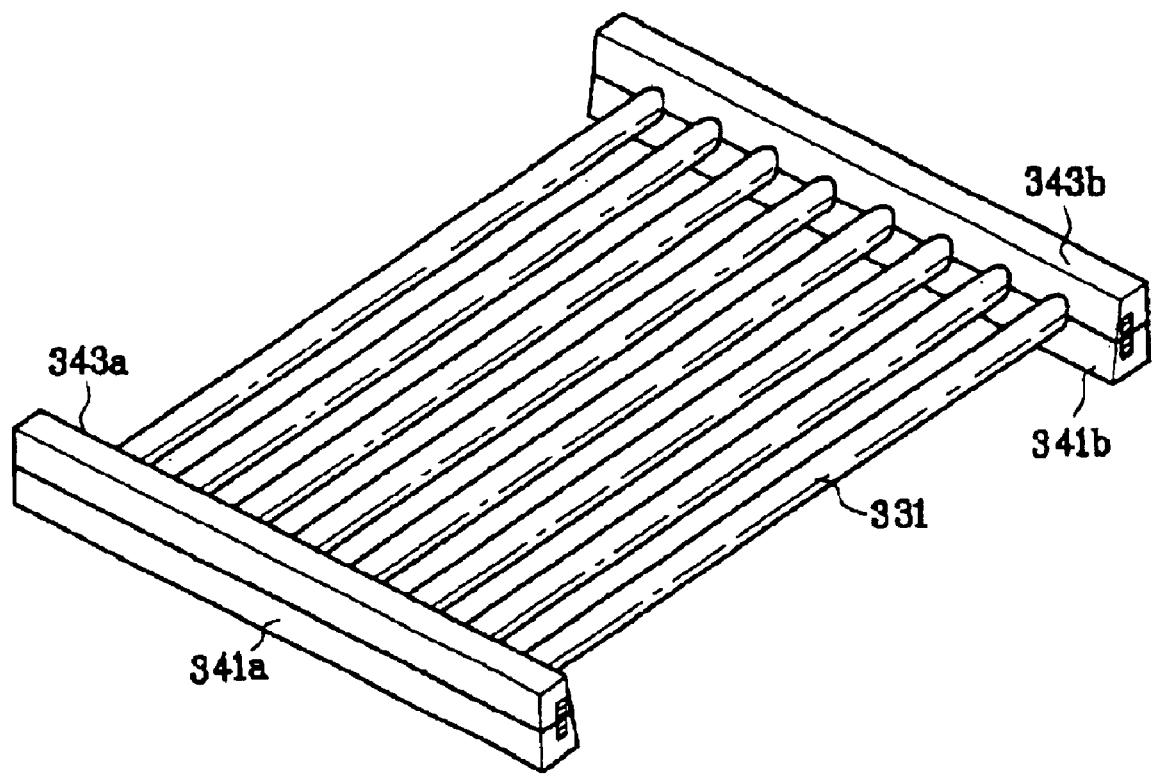
Figure 7C:
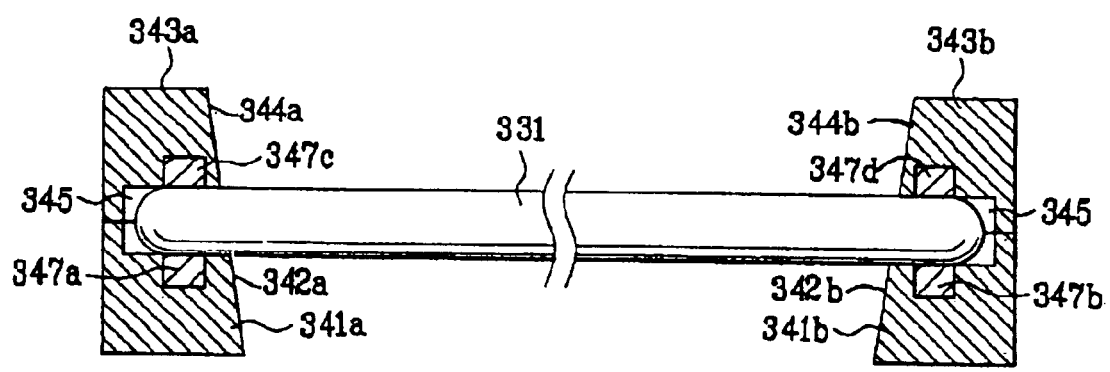

FIGS. 7A, 7B, and 7C are perspective and cross-sectional views of another exemplary direct-type back light device according to the present invention. In FIG. 7A, the direct-type back light device may include a plurality of luminescent lamps 331, a first lower support 341a, a second lower support 341b, a first upper support 343a corresponding to the first lower support 341a, and a second upper support 343b corresponding to the second lower support 341b. Each of the plurality of luminescent lamps 331 may include electrodes (not shown) formed inside the luminescent lamps 331 at opposite ends, and may be arranged in parallel along a first direction, which corresponds to a length direction of the luminescent lamps 331, and spaced apart from each other by a first interval along a second direction perpendicular to the first direction. Alternatively, the luminescent lamps 331 may include electrodes (not shown) formed along outside surfaces of the luminescent lamps 331 at opposite ends of the luminescent lamps 331.

The first lower support 341a and the second lower support 341b may be spaced apart from each other along the first direction by a constant interval that corresponds to a length of the luminescent lamps 331. In addition, the first and second lower supports 341a and 341b may include grooves 345 for receiving first portions of the opposite ends of the luminescent lamps 331. The first and second upper supports 343a and 343b may include grooves 345 for receiving second portions of the opposite ends of the luminescent lamps 331. Accordingly, the first and second lower supports 341a and 341b and the first and second upper supports 343a and 343b may secure the opposite ends of each of the luminescent lamps 331. The grooves 345 may be formed to partially pass through each of the first and second lower and upper supports 341a, 341b, 343a, and 343b so that the opposite ends of the luminescent lamps 331 do not extend through the first and second lower and upper supports 341a, 341b, 343a, and 343b, thereby constraining each of the luminescent lamps 331 along the first and second directions. In addition, each groove 345 of the first and second lower supports 341a and 341b and the first and second upper supports 343a and 343b may have a depth corresponding to a radius of the luminescent lamps 331.

The first lower support 341a may include a conductive layer 347a formed within a trench along a length direction of the first lower support 341a. The second lower support 341b may include a conductive layer 347b formed within a trench along a length direction of the second lower support 341b. The first upper support 343a may include a conductive layer 347c formed within a trench along a length direction of the first upper support 343a. The second upper support 343b may include a conductive layer 347d formed within a trench along a length direction of the second upper support 343b. The conductive layers 347a, 347b, 347c, and 347d supply power to the electrodes of the luminescent lamps 331. Alternatively, the conductive layers 347a and 347b may be formed as an electrically conductive coating upon uppermost surfaces of the first and second lower supports 341a and 341b along the length directions, and the conductive layers 347c and 347d may be formed as an electrically conductive coating upon lowermost surfaces of the first and second upper supports 343a and 343b along the length directions. Accordingly, the electrically conductive coatings formed on the uppermost and lowermost surfaces of the first and second lower and upper supports 341a, 341b, 343a, and 343b may extend along side surfaces of the first and second lower and upper supports 341a, 341b, 343a, and 343b in order to make electrical contact to a connector (not shown).

In FIG. 7B, since the luminescent lamps 331 may be connected with a driving circuit (not shown) through one connector connected with the conductive layers 347a, 347b, 347c and 347d, a total number of the connectors may be significantly reduced. Accordingly, a connection line between the luminescent lamps 331 and the driving circuit (not shown) may be simplified, thereby improving manufacturing efficiency.

In FIG. 7C, the first lower support 341a may include a first inclined surface 342a, and the second lower support 341b may include a second inclined surface 342b. The first upper support 343a may include a first inclined surface 344a, and the second upper support 343b may include a second inclined surface 344b. The first and second inclined surfaces 342a and 342b of the first and second lower supports 341a and 341b, and the first and second inclined surfaces 344a and 344b of the first and second upper supports 343a and 343b may be inclined with respect to lines normal to surfaces of the luminescent lamps 331 by an angle θ that is within a range of about 10° to 30°. Accordingly, an uppermost thickness of the first and second upper supports 343a and 343b along the first direction may be less than an uppermost thickness of the first and second lower supports 341a and 341b along the first direction. Thus, a luminescent area of the plurality of luminescent lamps 331 may be further increased at a region corresponding to end portions of the luminescent lamps 331.

In addition, a light scattering system (not shown) that may include a diffusion sheet and a diffusion plate, for example, may scatter light emitted from the luminescent lamps 331. Accordingly, the light scattering system (not shown) may be arranged above the first and second upper supports 343a and 343b so that the scattered light is uniformly distributed upon a display portion of an LCD panel.

Figure 8A:
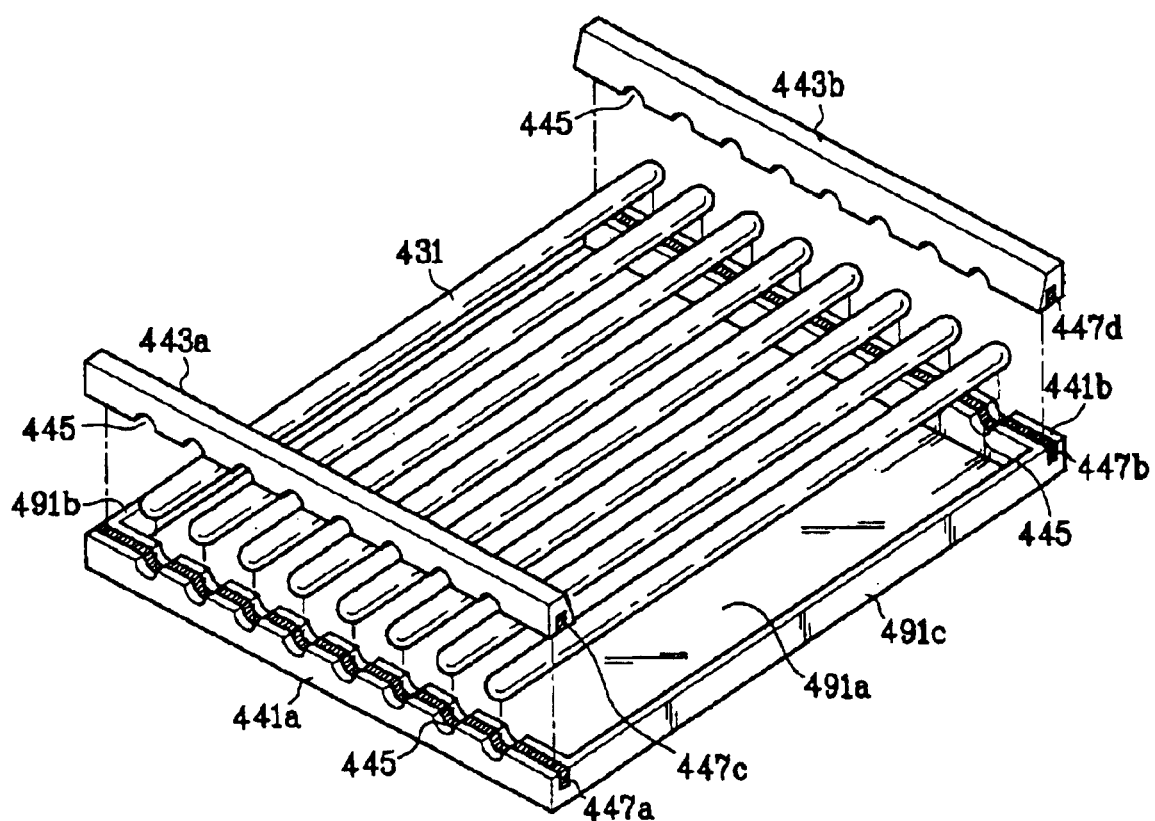
FIGS. 8A and 8B are perspective and cross-sectional views of another exemplary direct-type back light device according to the present invention.
Figure 8B:
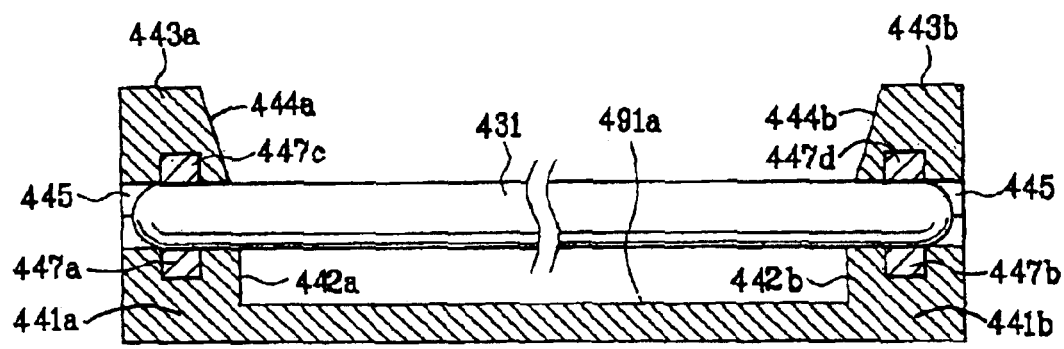

FIGS. 8A and 8B are perspective and cross-sectional views of another exemplary direct-type back light device according to the present invention. In FIG. 8A, the direct-type back light device may include a plurality of luminescent lamps 431, a first lower support 441a, a second lower support 441b, a lower support plate 491a, a first lower side rail support support 491b, a second lower side rail support support 491c, a first upper support 443a corresponding to the first lower support 441a, and a second upper support 443b corresponding to the second lower support 441b. Each of the plurality of luminescent lamps 431 may include electrodes (not shown) formed inside the luminescent lamps 431 at opposite ends, and may be arranged in parallel along a first direction, which corresponds to a length direction of the luminescent lamps 431, and spaced apart from each other by a first interval along a second direction perpendicular to the first direction. Alternatively, the luminescent lamps 431 may include electrodes (not shown) formed along outside surfaces of the luminescent lamps 431 at opposite ends of the luminescent lamps 431.

The first lower support 441a and the second lower support 441b may be interconnected by the lower support plate 491a, the first lower side rail support support 491b, and the second lower side rail support support 491c. The first lower support 441a and the second lower support 441b may be spaced apart from each other along the first direction by a constant interval that corresponds to a length of the luminescent lamps 431. In addition, the first and second lower supports 441a and 441b may include grooves 445 for receiving first portions of the opposite ends of the luminescent lamps 431. The first and second upper supports 443a and 443b may include grooves 445 for receiving second portions of the opposite ends of the luminescent lamps 431. Accordingly, the first and second lower supports 441a and 441b and the first and second upper supports 443a and 443b may secure the opposite ends of each of the luminescent lamps 431. The grooves 445 may be formed to completely pass through each of the first and second lower and upper supports 441a, 441b, 443a, and 443b so that the opposite ends of the luminescent lamps 431 extend through the first and second lower and upper supports 441a, 441b, 443a, and 443b, thereby constraining each of the luminescent lamps 431 along the second direction. In addition, each groove 445 of the first and second lower supports 441a and 441b and the first and second upper supports 443a and 443b may have a depth corresponding to a radius of the luminescent lamps 431.

The first lower support 441a may include a conductive layer 447a formed within a trench along a length direction of the first lower support 441a. The second lower support 441b may include a conductive layer 447b formed within a trench along a length direction of the second lower support 441b. The first upper support 443a may include a conductive layer 447c formed within a trench along a length direction of the first upper support 443a. The second upper support 443b may include a conductive layer 447d formed within a trench along a length direction of the second upper support 443b. The conductive layers 447a, 447b, 447c, and 447d supply power to the electrodes of the luminescent lamps 431. Alternatively, the conductive layers 447a and 447b may be formed as an electrically conductive coating upon uppermost surfaces of the first and second lower supports 441a and 441b along the length directions, and the conductive layers 447c and 447d may be formed as an electrically conductive coating upon lowermost surfaces of the first and second upper supports 443a and 443b along the length directions. Accordingly, the electrically conductive coatings formed on the uppermost and lowermost surfaces of the first and second lower and upper supports 441a, 441b, 443a, and 443b may extend along side surfaces of the first and second lower and upper supports 441a, 441b, 443a, and 443b in order to make electrical contact to a connector (not shown).

In FIG. 8B, the first lower support 441a may include a first surface 442a that is normal to a surface of the luminescent lamp 431, and the second lower support 441b may include a second surface 442b that is also normal to the surface of the luminescent lamp 431. The first upper support 443a may include a first inclined surface 444a, and the second upper support 443b may include a second inclined surface 444b. The first and second surfaces 444a and 444b may be inclined with respect to a line normal to a surface of the luminescent lamps 431 by an angle θ that is within a range of about 10° to 30°. Accordingly, a thickness of the first and second upper supports 443a and 443b along the first direction may be less than a thickness of the first and second lower supports 441a and 441b along the first direction. Thus, a luminescent area of the plurality of luminescent lamps 431 may be increased at a region corresponding to end portions of the luminescent lamps 431.

In addition, the lower support plate 491a, and the first and second lower side rail support supports 491b and 491c may be formed from a material that has a high light reflectivity so that inner surfaces of the lower support plate 491a and the first and second lower side rail support supports 491b and 491c function as reflecting plates. Alternatively, a coating may be applied to the inner surfaces of the lower support plate 491a and the first and second lower side rail support supports 491b and 491c to create highly reflective surfaces, thereby increasing scattering of light emitted by the luminescent lamps 431.

In addition, a light scattering system (not shown) that may include a diffusion sheet and a diffusion plate, for example, may scatter light emitted from the luminescent lamps 431. Accordingly, the light scattering system (not shown) may be arranged above the first and second upper supports 443a and 443b so that the scattered light is uniformly distributed upon a display portion of an LCD panel.

Figure 9A:
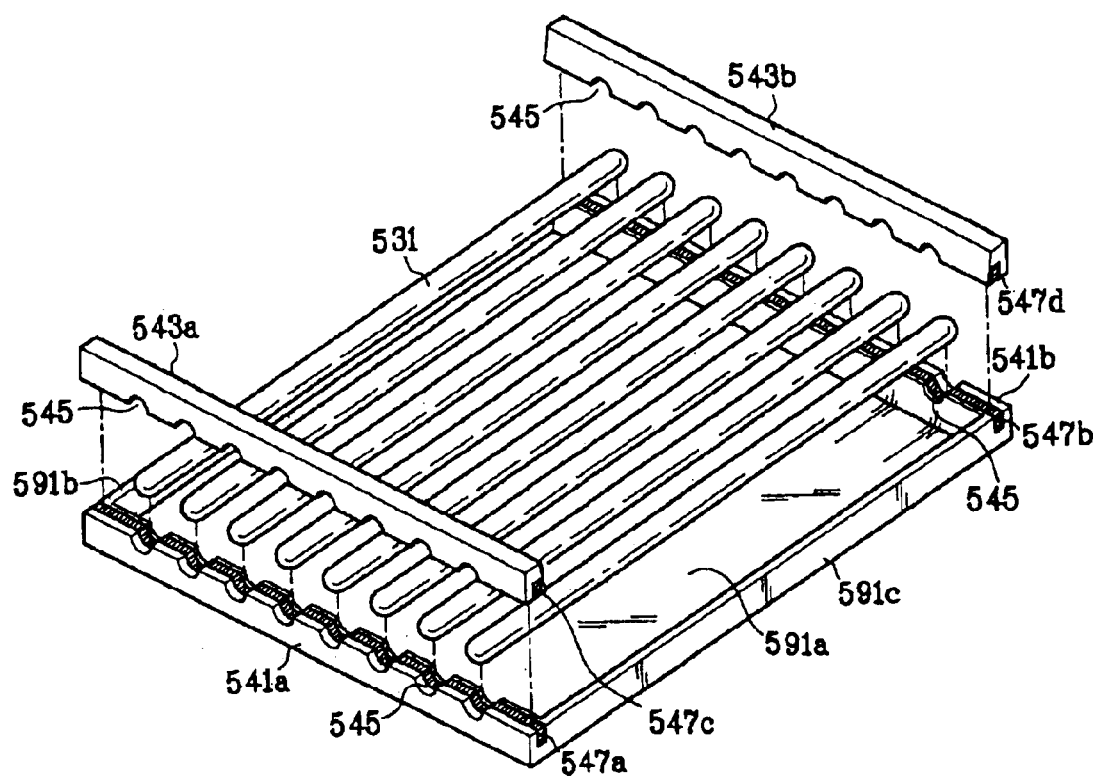
FIGS. 9A and 9B are perspective and cross-sectional views of another exemplary direct-type back light device according to the present invention.
Figure 9B:
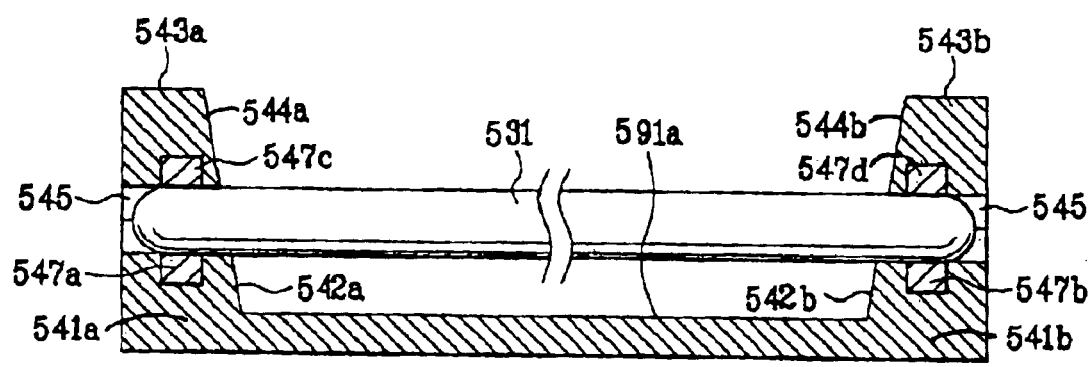

FIGS. 9A and 9B are perspective and cross-sectional views of another exemplary direct-type back light device according to the present invention. In FIG. 9A, the direct-type back light device may include a plurality of luminescent lamps 531, a first lower support 541a, a second lower support 541b, a lower support plate 591a, a first lower side rail support support 591b, a second lower side rail support support 591c, a first upper support 543a corresponding to the first lower support 541a, and a second upper support 543b corresponding to the second lower support 541b. Each of the plurality of luminescent lamps 531 may include electrodes (not shown) formed inside the luminescent lamps 531 at opposite ends, and may be arranged in parallel along a first direction, which corresponds to a length direction of the luminescent lamps 531, and spaced apart from each other by a first interval along a second direction perpendicular to the first direction. Alternatively, the luminescent lamps 531 may include electrodes (not shown) formed along outside surfaces of the luminescent lamps 531 at opposite ends of the luminescent lamps 531.

The first lower support 541a and the second lower support 541b may be interconnected by the lower support plate 591a, the first lower side rail support support 591b, and the second lower side rail support support 591c. The first lower support 541a and the second lower support 541b may be spaced apart from each other along the first direction by a constant interval that corresponds to a length of the luminescent lamps 531. In addition, the first and second lower supports 541a and 541b may include grooves 545 for receiving first portions of the opposite ends of the luminescent lamps 531. The first and second upper supports 543a and 543b may include grooves 545 for receiving second portions of the opposite ends of the luminescent lamps 531. Accordingly, the first and second lower supports 541a and 541b and the first and second upper supports 543a and 543b may secure the opposite ends of each of the luminescent lamps 531. The grooves 545 may be formed to completely pass through each of the first and second lower and upper supports 541a, 541b, 543a, and 543b so that the opposite ends of the luminescent lamps 531 extend through the first and second lower and upper supports 541a, 541b, 543a, and 543b, thereby constraining each of the luminescent lamps 531 along the second direction. In addition, each groove 545 of the first and second lower supports 541a and 541b and the first and second upper supports 543a and 543b may have a depth corresponding to a radius of the luminescent lamps 531.

The first lower support 541a may include a conductive layer 547a formed within a trench along a length direction of the first lower support 541a. The second lower support 541b may include a conductive layer 547b formed within a trench along a length direction of the second lower support 541b. The first upper support 543a may include a conductive layer 547c formed within a trench along a length direction of the first upper support 543a. The second upper support 543b may include a conductive layer 547d formed within a trench along a length direction of the second upper support 543b. The conductive layers 547a, 547b, 547c, and 547d supply power to the electrodes of the luminescent lamps 531. Alternatively, the conductive layers 547a and 547b may be formed as an electrically conductive coating upon uppermost surfaces of the first and second lower supports 541a and 541b along the length directions, and the conductive layers 547c and 547d may be formed as an electrically conductive coating upon lowermost surfaces of the first and second upper supports 543a and 543b along the length directions. Accordingly, the electrically conductive coatings formed on the uppermost and lowermost surfaces of the first and second lower and upper supports 541a, 541b, 543a, and 543b may extend along side surfaces of the first and second lower and upper supports 541a, 541b, 543a, and 543b in order to make electrical contact to a connector (not shown).

In FIG. 9B, the first lower support 541a may include a first inclined surface 542a, and the second lower support 541b may include a second inclined surface 542b. The first upper support 543a may include a first inclined surface 544a, and the second upper support 543b may include a second inclined surface 544b. The first and second inclined surfaces 542a and 542b of the first and second lower supports 541a and 541b, and the first and second inclined surfaces 544a and 544b of the first, and second upper supports 543a and 543b may be inclined with respect to lines normal to surfaces of the luminescent lamps 531 by an angle θ that is within a range of about 10° to 30°. Accordingly, an uppermost thickness of the first and second upper supports 543a and 543b along the first direction may be less than an uppermost thickness of the first and second lower supports 541a and 541b along the first direction. Thus, a luminescent area of the plurality of luminescent lamps 531 may be further increased at a region corresponding to end portions of the luminescent lamps 531.

In addition, a light scattering system (not shown) that may include a diffusion sheet and a diffusion plate, for example, may scatter light emitted from the luminescent lamps 531. Accordingly, the light scattering system (not shown) may be arranged above the first and second upper supports 543a and 543b so that the scattered light is uniformly distributed upon a display portion of an LCD panel.

Figure 10A:
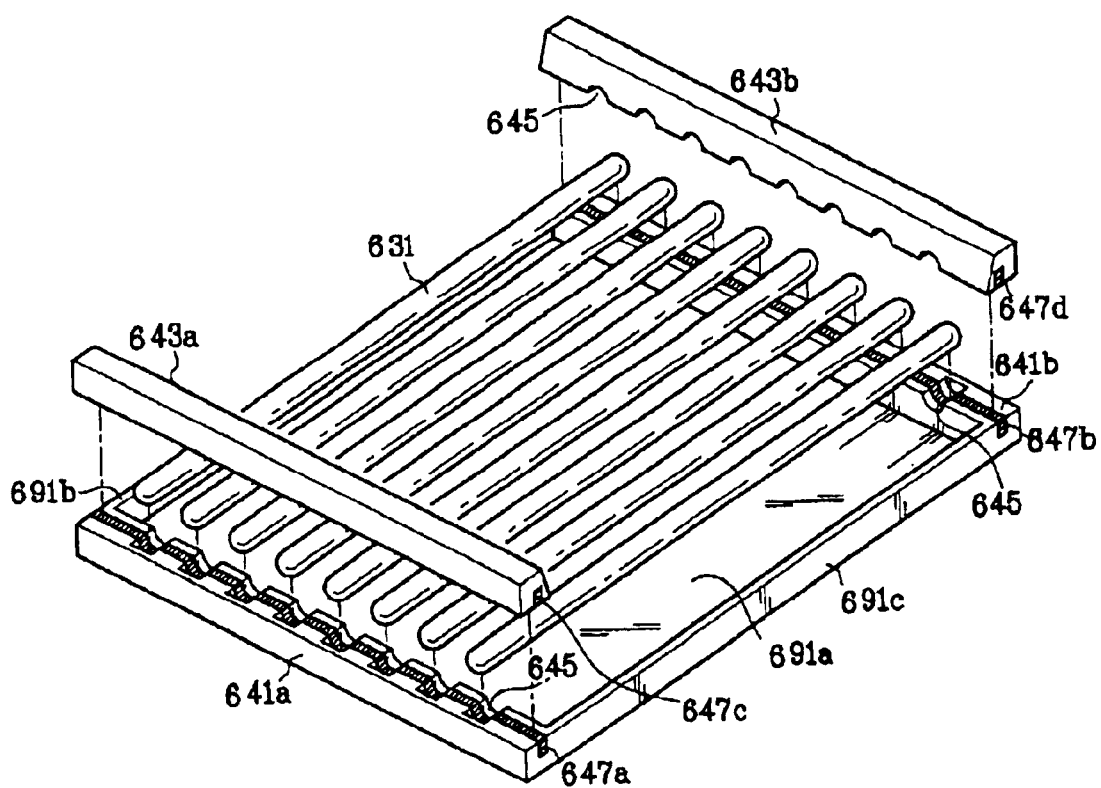
FIGS. 10A and 10B are perspective and cross-sectional views of another exemplary direct-type back light device according to the present invention.
Figure 10B:
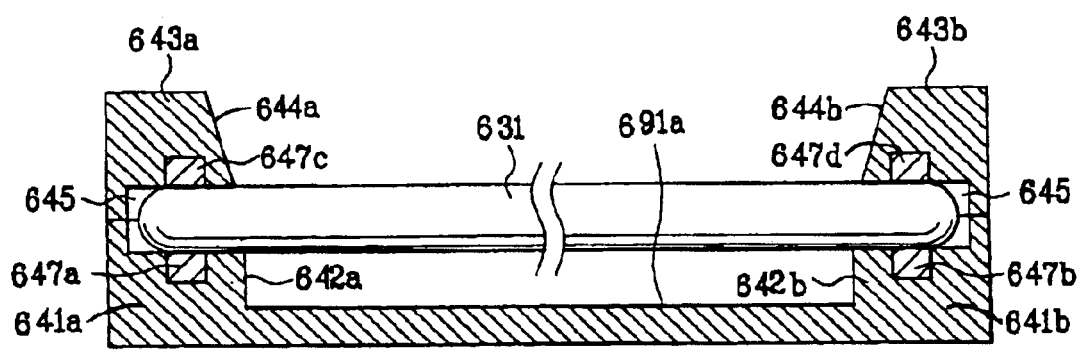

FIGS. 10A and 10B are perspective and cross-sectional views of another exemplary direct-type back light device according to the present invention. In FIG. 10A, the direct-type back light device may include a plurality of luminescent lamps 631, a first lower support 641a, a second lower support 641b, a lower support plate 691a, a first lower side rail support support 691b, a second lower side rail support support 691c, a first upper support 643a corresponding to the first lower support 641a, and a second upper support 643b corresponding to the second lower support 641b. Each of the plurality of luminescent lamps 631 may include electrodes (not shown) formed inside the luminescent lamps 631 at opposite ends, and may be arranged in parallel along a first direction, which corresponds to a length direction of the luminescent lamps 631, and spaced apart from each other by a first interval along a second direction perpendicular to the first direction. Alternatively, the luminescent lamps 631 may include electrodes (not shown) formed along outside surfaces of the luminescent lamps 631 at opposite ends of the luminescent lamps 631.

The first lower support 641a and the second lower support 641b may be interconnected by the lower support plate 691a, the first lower side rail support support 691b, and the second lower side rail support support 691c. The first lower support 641a and the second lower support 641b may be spaced apart from each other along the first direction by a constant interval that corresponds to a length of the luminescent lamps 631. In addition, the first and second lower supports 641a and 641b may include grooves 645 for receiving first portions of the opposite ends of the luminescent lamps 631. The first and second upper supports 643a and 643b may include grooves 645 for receiving second portions of the opposite ends of the luminescent lamps 631. Accordingly, the first and second lower supports 641a and 641b and the first and second upper supports 643a and 643b may secure the opposite ends of each of the luminescent lamps 631. The grooves 645 may be formed to partially pass through each of the first and second lower and upper supports 641a, 641b, 643a, and 643b so that the opposite ends of the luminescent lamps 631 do not extend through the first and second lower and upper supports 641a, 641b, 643a, and 643b, thereby constraining each of the luminescent lamps 631 along the first and second directions. In addition, each groove 645 of the first and second lower supports 641a and 641b and the first and second upper supports 643a and 643b may have a depth corresponding to a radius of the luminescent lamps 631.

The first lower support 641a may include a conductive layer 647a formed within a trench along a length direction of the first lower support 641a. The second lower support 641b may include a conductive layer 647b formed within a trench along a length direction of the second lower support 641b. The first upper support 643a may include a conductive layer 647c formed within a trench along a length direction of the first upper support 643a. The second upper support 643b may include a conductive layer 647d formed within a trench along a length direction of the second upper support 643b. The conductive layers 647a, 647b, 647c, and 647d supply power to the electrodes of the luminescent lamps 631. Alternatively, the conductive layers 647a and 647b may be formed as an electrically conductive coating upon uppermost surfaces of the first and second lower supports 641a and 641b along the length directions, and the conductive layers 647c and 647d may be formed as an electrically conductive coating upon lowermost surfaces of the first and second upper supports 643a and 643b along the length directions. Accordingly, the electrically conductive coatings formed on the uppermost and lowermost surfaces of the first and second lower and upper supports 641a, 641b, 643a, and 643b may extend along side surfaces of the first and second lower and upper supports 641a, 641b, 643a, and 643b in order to make electrical contact to a connector (not shown).

In FIG. 10B, the first lower support 641a may include a first surface 642a that is normal to a surface of the luminescent lamp 631, and the second lower support 641b may include a second surface 642b that is also normal to the surface of the luminescent lamp 631. The first upper support 643a may include a first inclined surface 644a, and the second upper support 643b may include a second inclined surface 644b. The first and second surfaces 644a and 644b may be inclined with respect to a line normal to a surface of the luminescent lamps 631 by an angle θ that is within a range of about 10° to 30°. Accordingly, a thickness of the first and second upper supports 643a and 643b along the first direction may be less than a thickness of the first and second lower supports 641a and 641b along the first direction. Thus, a luminescent area of the plurality of luminescent lamps 631 may be increased at a region corresponding to end portions of the luminescent lamps 631.

In addition, the lower support plate 691a, and the first and second lower side rail support supports 691b and 691c may be formed from a material that has a high light reflectivity so that inner surfaces of the lower support plate 691a and the first and second lower side rail support supports 691b and 691c function as reflecting plates. Alternatively, a coating may be applied to the inner surfaces of the lower support plate 691a and the first and second lower side rail support supports 691b and 691c to create highly reflective surfaces, thereby increasing scattering of light emitted by the luminescent lamps 631.

In addition, a light scattering system (not shown) that may include a diffusion sheet and a diffusion plate, for example, may scatter light emitted from the luminescent lamps 631. Accordingly, the light scattering system (not shown) may be arranged above the first and second upper supports 643a and 643b so that the scattered light is uniformly distributed upon a display portion of an LCD panel.

Figure 11A:
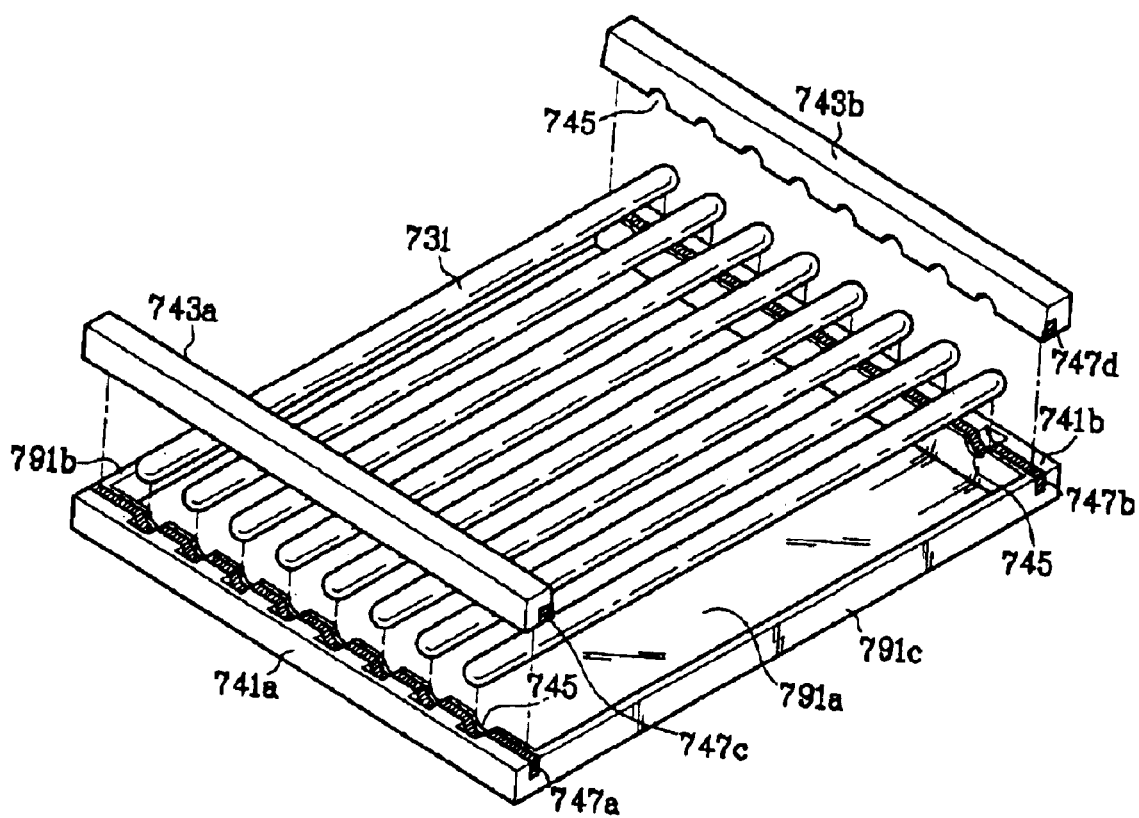
FIGS. 11A and 11B are perspective and cross-sectional views of another exemplary direct-type back light device according to the present invention.
Figure 11B:
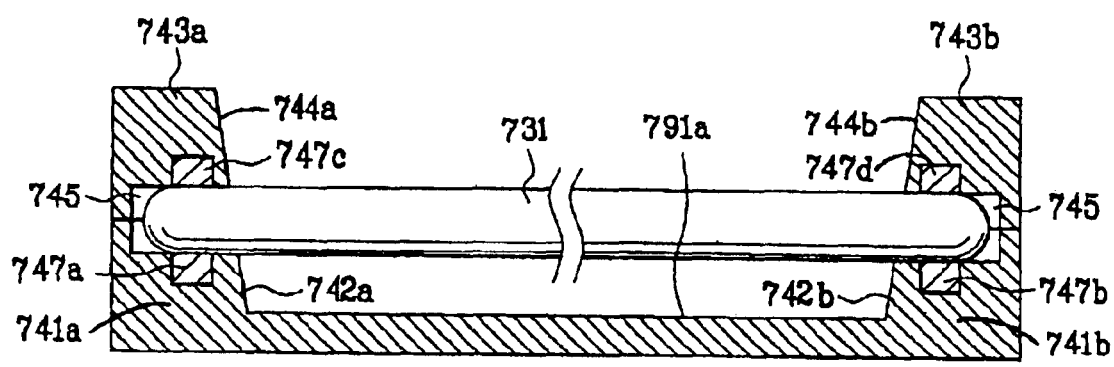

FIGS. 11A and 11B are perspective and cross-sectional views of another exemplary direct-type back light device according to the present invention. In FIG. 11A, the direct-type back light device may include a plurality of luminescent lamps 731, a first lower support 741a, a second lower support 741b, a lower support plate 791a, a first lower side rail support support 791b, a second lower side rail support support 791c, a first upper support 743a corresponding to the first lower support 741a, and a second upper support 743b corresponding to the second lower support 741b. Each of the plurality of luminescent lamps 731 may include electrodes (not shown) formed inside the luminescent lamps 731 at opposite ends, and may be arranged in parallel along a first direction, which corresponds to a length direction of the luminescent lamps 731, and spaced apart from each other by a first interval along a second direction perpendicular to the first direction. Alternatively, the luminescent lamps 731 may include electrodes (not shown) formed along outside surfaces of the luminescent lamps 731 at opposite ends of the luminescent lamps 731.

The first lower support 741a and the second lower support 741b may be interconnected by the lower support plate 791a, the first lower side rail support support 791b, and the second lower side rail support support 791c. The first lower support 741a and the second lower support 741b may be spaced apart from each other along the first direction by a constant interval that corresponds to a length of the luminescent lamps 731. In addition, the first and second lower supports 741a and 741b may include grooves 745 for receiving first portions of the opposite ends of the luminescent lamps 731. The first and second upper supports 743a and 743b may include grooves 745 for receiving second portions of the opposite ends of the luminescent lamps 731. Accordingly, the first and second lower supports 741a and 741b and the first and second upper supports 743a and 743b may secure the opposite ends of each of the luminescent lamps 731. The grooves 745 may be formed to partially pass through each of the first and second lower and upper supports 741a, 741b, 743a, and 743b so that the opposite ends of the luminescent lamps 731 do not extend through the first and second lower and upper supports 741a, 741b, 743a, and 743b, thereby constraining each of the luminescent lamps 731 along the first and second directions. In addition, each groove 745 of the first and second lower supports 741a and 741b and the first and second upper supports 743a and 743b may have a depth corresponding to a radius of the luminescent lamps 731.

The first lower support 741a may include a conductive layer 747a formed within a trench along a length direction of the first lower support 741a. The second lower support 741b may include a conductive layer 747b formed within a trench along a length direction of the second lower support 741b. The first upper support 743a may include a conductive layer 747c formed within a trench along a length direction of the first upper support 743a. The second upper support 743b may include a conductive layer 747d formed within a trench along a length direction of the second upper support 743b. The conductive layers 747a, 747b, 747c, and 747d supply power to the electrodes of the luminescent lamps 731. Alternatively, the conductive layers 747a and 747b may be formed as an electrically conductive coating upon uppermost surfaces of the first and second lower supports 741a and 741b along the length directions, and the conductive layers 747c and 747d may be formed as an electrically conductive coating upon lowermost surfaces of the first and second upper supports 743a and 743b along the length directions. Accordingly, the electrically conductive coatings formed on the uppermost and lowermost surfaces of the first and second lower and upper supports 741a, 741b, 743a, and 743b may extend along side surfaces of the first and second lower and upper supports 741a, 741b, 743a, and 743b in order to make electrical contact to a connector (not shown).

In FIG. 11B, the first lower support 741a may include a first inclined surface 742a, and the second lower support 741b may include a second inclined surface 742b. The first upper support 743a may include a first inclined surface 744a, and the second upper support 743b may include a second inclined surface 744b. The first and second inclined surfaces 742a and 742b of the first and second lower supports 741a and 741b, and the first and second inclined surfaces 744a and 744b of the first and second upper supports 743a and 743b may be inclined with respect to lines normal to surfaces of the luminescent lamps 731 by an angle θ that is within a range of about 10° to 30°. Accordingly, an uppermost thickness of the first and second upper supports 743a and 743b along the first direction may be less than an uppermost thickness of the first and second lower supports 741a and 741b along the first direction. Thus, a luminescent area of the plurality of luminescent lamps 731 may be further increased at a region corresponding to end portions of the luminescent lamps 731.

In addition, a light scattering system (not shown) that may include a diffusion sheet and a diffusion plate, for example, may scatter light emitted from the luminescent lamps 731. Accordingly, the light scattering system (not shown) may be arranged above the first and second upper supports 743a and 743b so that the scattered light is uniformly distributed upon a display portion of an LCD panel.

Figure 12A:
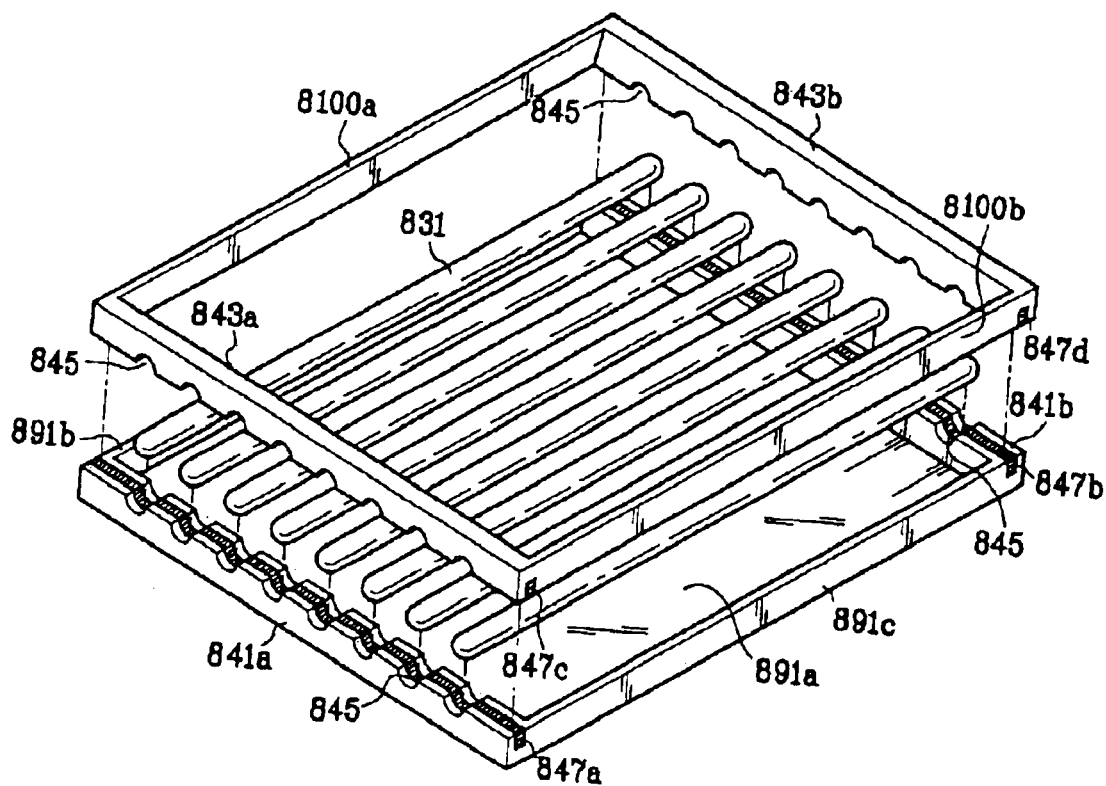
FIGS. 12A and 12B are perspective and cross-sectional views of another exemplary direct-type back light device according to the present invention.
Figure 12B:
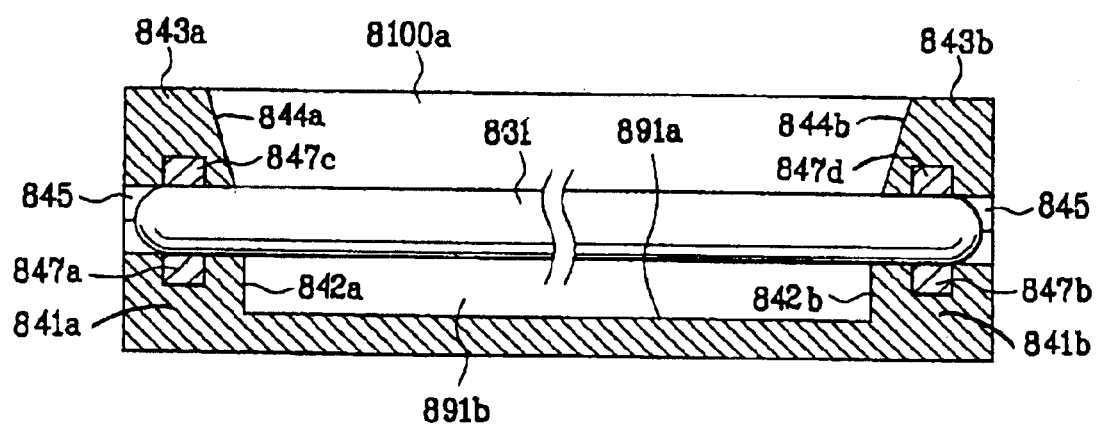

FIGS. 12A and 12B are perspective and cross-sectional views of another exemplary direct-type back light device according to the present invention. In FIG. 12A, the direct-type back light device may include a plurality of luminescent lamps 831, a first lower support 841a, a second lower support 841b, a lower support plate 891a, a first lower side rail support support 891b, a second lower side rail support support 891c, a first upper support 843a corresponding to the first lower support 841a, a second upper support 843b corresponding to the second lower support 841b, a first upper side rail support support 8100a, and a second upper side rail support support 8100b. Each of the plurality of luminescent lamps 831 may include electrodes (not shown) formed inside the luminescent lamps 831 at opposite ends, and may be arranged in parallel along a first direction, which corresponds to a length direction of the luminescent lamps 831, and spaced apart from each other by a first interval along a second direction perpendicular to the first direction. Alternatively, the luminescent lamps 831 may include electrodes (not shown) formed along outside surfaces of the luminescent lamps 831 at opposite ends of the luminescent lamps 831.

The first lower support 841a and the second lower support 841b may be interconnected by the lower support plate 891a, the first lower side rail support support 891b, and the second lower side rail support support 891c. The first lower support 841a and the second lower support 841b may be spaced apart from each other along the first direction by a constant interval that corresponds to a length of the luminescent lamps 831.

The first upper support 843a and the second upper support 843b may be interconnected by the first upper side rail support support 8100a and the second upper side rail support support 8100b. The first upper support 843a and the second upper support 843b may be spaced apart from each other along the first direction by a constant interval that corresponds to a length of the luminescent lamps 831.

In addition, the first and second lower supports 841a and 841b may include grooves 845 for receiving first portions of the opposite ends of the luminescent lamps 831. The first and second upper supports 843a and 843b may include grooves 845 for receiving second portions of the opposite ends of the luminescent lamps 831. Accordingly, the first and second lower supports 841a and 841b and the first and second upper supports 843a and 843b may secure the opposite ends of each of the luminescent lamps 831. The grooves 845 may be formed to completely pass through each of the first and second lower and upper supports 841a, 841b, 843a, and 843b so that the opposite ends of the luminescent lamps 831 extend through the first and second lower and upper supports 841a, 841b, 843a, and 843b, thereby constraining each of the luminescent lamps 831 along the second direction. In addition, each groove 845 of the first and second lower supports 841a and 841b and the first and second upper supports 843a and 843b may have a depth corresponding to a radius of the luminescent lamps 831.

The first lower support 841a may include a conductive layer 847a formed within a trench along a length direction of the first lower support 841a. The second lower support 841b may include a conductive layer 847b formed within a trench along a length direction of the second lower support 841b. The first upper support 843a may include a conductive layer 847c formed within a trench along a length direction of the first upper support 843a. The second upper support 843b may include a conductive layer 847d formed within a trench along a length direction of the second upper support 843b. The conductive layers 847a, 847b, 847c, and 847d supply power to the electrodes of the luminescent lamps 831. Alternatively, the conductive layers 847a and 847b may be formed as an electrically conductive coating upon uppermost surfaces of the first and second lower supports 841a and 841b along the length directions, and the conductive layers 847c and 847d may be formed as an electrically conductive coating upon lowermost surfaces of the first and second upper supports 843a and 843b along the length directions. Accordingly, the electrically conductive coatings formed on the uppermost and lowermost surfaces of the first and second lower and upper supports 841a, 841b, 843a, and 843b may extend along side surfaces of the first and second lower and upper supports 841a, 841b, 843a, and 843b in order to make electrical contact to a connector (not shown).

In FIG. 12B, the first lower support 841a may include a first surface 842a that is normal to a surface of the luminescent lamp 831, and the second lower support 841b may include a second surface 842b that is also normal to the surface of the luminescent lamp 831. The first upper support 843a may include a first inclined surface 844a, and the second upper support 843b may include a second inclined surface 844b. The first and second surfaces 844a and 844b may be inclined with respect to a line normal to a surface of the luminescent lamps 831 by an angle θ that is within a range of about 10° to 30°. Accordingly, a thickness of the first and second upper supports 843a and 843b along the first direction may be less than a thickness of the first and second lower supports 841a and 841b along the first direction. Thus, a luminescent area of the plurality of luminescent lamps 831 may be increased at a region corresponding to end portions of the luminescent lamps 831.

In addition, the lower support plate 891a, the first and second lower side rail support supports 891b and 891c, and the first and second upper side rail support supports 8100a and 8100b may be formed from a material that has a high light reflectivity so that inner surfaces of the lower support plate 891a, the first and second lower side rail support supports 891b and 891c, and the first and second upper side rail support supports 8100a and 8100b function as reflecting plates. Alternatively, a coating may be applied to the inner surfaces of the lower support plate 891a, the first and second lower side rail support supports 891b and 891c, and the first and second upper side rail support supports 8100a and 8100b to create highly reflective surfaces, thereby increasing scattering of light emitted by the luminescent lamps 831.

In addition, a light scattering system (not shown) that may include a diffusion sheet and a diffusion plate, for example, may scatter light emitted from the luminescent lamps 831. Accordingly, the light scattering system (not shown) may be arranged above the first and second upper supports 843a and 843b and first and second upper side rail support supports 8100a and 8100b so that the scattered light is uniformly distributed upon a display portion of an LCD panel.

Figure 13A:
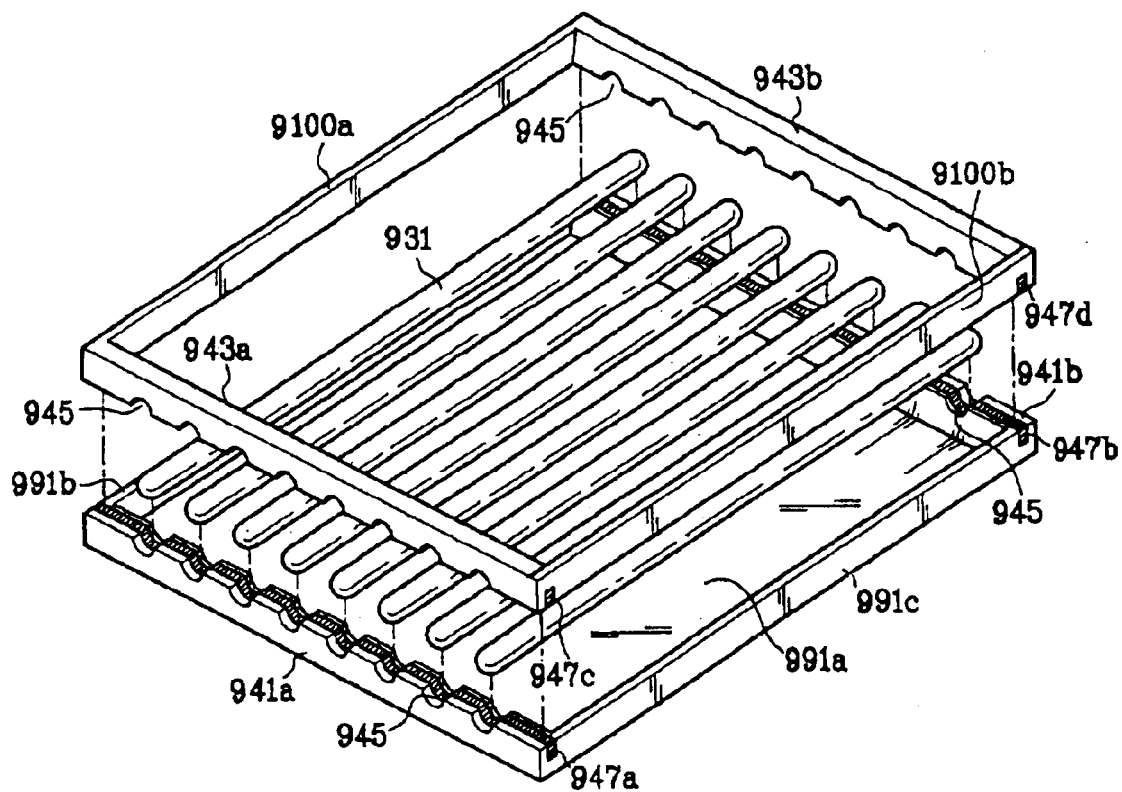
FIGS. 13A and 13B are perspective and cross-sectional views of another exemplary direct-type back light device according to the present invention.
Figure 13B:
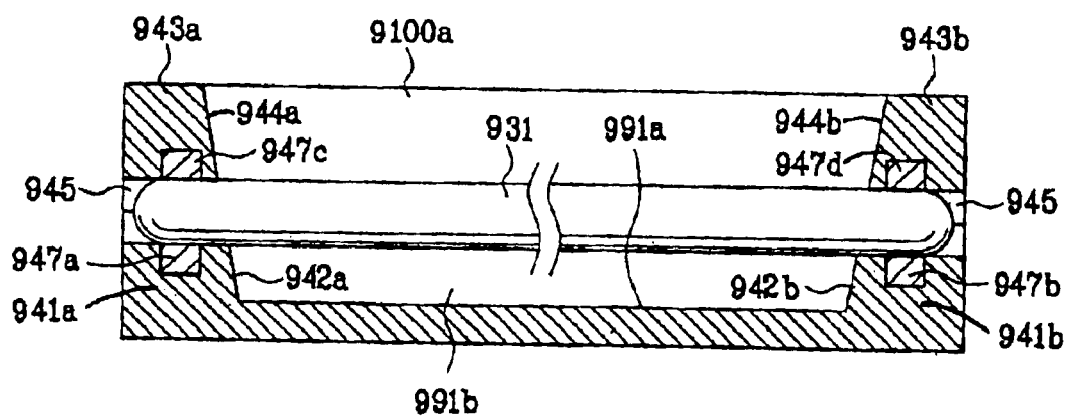

FIGS. 13A and 13B are perspective and cross-sectional views of another exemplary direct-type back light device according to the present invention. In FIG. 13A, the direct-type back light device may include a plurality of luminescent lamps 931, a first lower support 941a, a second lower support 941b, a lower support plate 991a, a first lower side rail support support 991b, a second lower side rail support support 991c, a first upper support 943a corresponding to the first lower support 941a, a second upper support 943b corresponding to the second lower support 941b, a first upper side rail support support 9100a, and a second upper side rail support support 9100b. Each of the plurality of luminescent lamps 931 may include electrodes (not shown) formed inside the luminescent lamps 931 at opposite ends, and may be arranged in parallel along a first direction, which corresponds to a length direction of the luminescent lamps 931, and spaced apart from each other by a first interval along a second direction perpendicular to the first direction. Alternatively, the luminescent lamps 931 may include electrodes (not shown) formed along outside surfaces of the luminescent lamps 931 at opposite ends of the luminescent lamps 931.

The first lower support 941a and the second lower support 941b may be interconnected by the lower support plate 991a, the first lower side rail support support 991b, and the second lower side rail support support 991c. The first lower support 941a and the second lower support 941b may be spaced apart from each other along the first direction by a constant interval that corresponds to a length of the luminescent lamps 931.

The first upper support 943a and the second upper support 943b may be interconnected by the first upper side rail support support 9100a and the second upper side rail support support 9100b. The first upper support 943a and the second upper support 943b may be spaced apart from each other along the first direction by a constant interval that corresponds to a length of the luminescent lamps 931.

In addition, the first and second lower supports 941a and 941b may include grooves 945 for receiving first portions of the opposite ends of the luminescent lamps 931. The first and second upper supports 943a and 943b may include grooves 945 for receiving second portions of the opposite ends of the luminescent lamps 931. Accordingly, the first and second lower supports 941a and 941b and the first and second upper supports 943a and 943b may secure the opposite ends of each of the luminescent lamps 931. The grooves 945 may be formed to completely pass through each of the first and second lower and upper supports 941a, 941b, 943a, and 943b so that the opposite ends of the luminescent lamps 931 extend through the first and second lower and upper supports 941a, 941b, 943a, and 943b, thereby constraining each of the luminescent lamps 931 along the second direction. In addition, each groove 945 of the first and second lower supports 941a and 941b and the first and second upper supports 943a and 943b may have a depth corresponding to a radius of the luminescent lamps 931.

The first lower support 941a may include a conductive layer 947a formed within a trench along a length direction of the first lower support 941a. The second lower support 941b may include a conductive layer 947b formed within a trench along a length direction of the second lower support 941b. The first upper support 943a may include a conductive layer 947c formed within a trench along a length direction of the first upper support 943a. The second upper support 943b may include a conductive layer 947d formed within a trench along a length direction of the second upper support 943b. The conductive layers 947a, 947b, 947c, and 947d supply power to the electrodes of the luminescent lamps 931. Alternatively, the conductive layers 947a and 947b may be formed as an electrically conductive coating upon uppermost surfaces of the first and second lower supports 941a and 941b along the length directions, and the conductive layers 947c and 947d may be formed as an electrically conductive coating upon lowermost surfaces of the first and second upper supports 943a and 943b along the length directions. Accordingly, the electrically conductive coatings formed on the uppermost and lowermost surfaces of the first and second lower and upper supports 941a, 941b, 943a, and 943b may extend along side surfaces of the first and second lower and upper supports 941a, 941b, 943a, and 943b in order to make electrical contact to a connector (not shown).

In FIG. 13B, the first lower support 941a may include a first inclined surface 942a, and the second lower support 941b may include a second inclined surface 942b. The first upper support 943a may include a first inclined surface 944a, and the second upper support 943b may include a second inclined surface 944b. The first and second inclined surfaces 942a and 942b of the first and second lower supports 941a and 941b, and the first and second inclined surfaces 944a and 944b of the first and second upper supports 943a and 943b may be inclined with respect to lines normal to surfaces of the luminescent lamps 931 by an angle θ that is within a range of about 10° to 30°. Accordingly, an uppermost thickness of the first and second upper supports 943a and 943b along the first direction may be less than an uppermost thickness of the first and second lower supports 941a and 941b along the first direction. Thus, a luminescent area of the plurality of luminescent lamps 931 may be further increased at a region corresponding to end portions of the luminescent lamps 931.

In addition, the lower support plate 991a, the first and second lower side rail support supports 991b and 991c, and the first and second upper side rail support supports 9100a and 9100b may be formed from a material that has a high light reflectivity so that inner surfaces of the lower support plate 991a, the first and second lower side rail support supports 991b and 991c, and the first and second upper side rail support supports 9100a and 9100b function as reflecting plates. Alternatively, a coating may be applied to the inner surfaces of the lower support plate 991a, the first and second lower side rail support supports 991b and 991c, and the first and second upper side rail support supports 9100a and 9100b to create highly reflective surfaces, thereby increasing scattering of light emitted by the luminescent lamps 931.

In addition, a light scattering system (not shown) that may include a diffusion sheet and a diffusion plate, for example, may scatter light emitted from the luminescent lamps 931. Accordingly, the light scattering system (not shown) may be arranged above the first and second upper supports 943a and 943b and first and second upper side rail support supports 9100a and 9100b so that the scattered light is uniformly distributed upon a display portion of an LCD panel.

Figure 14A:
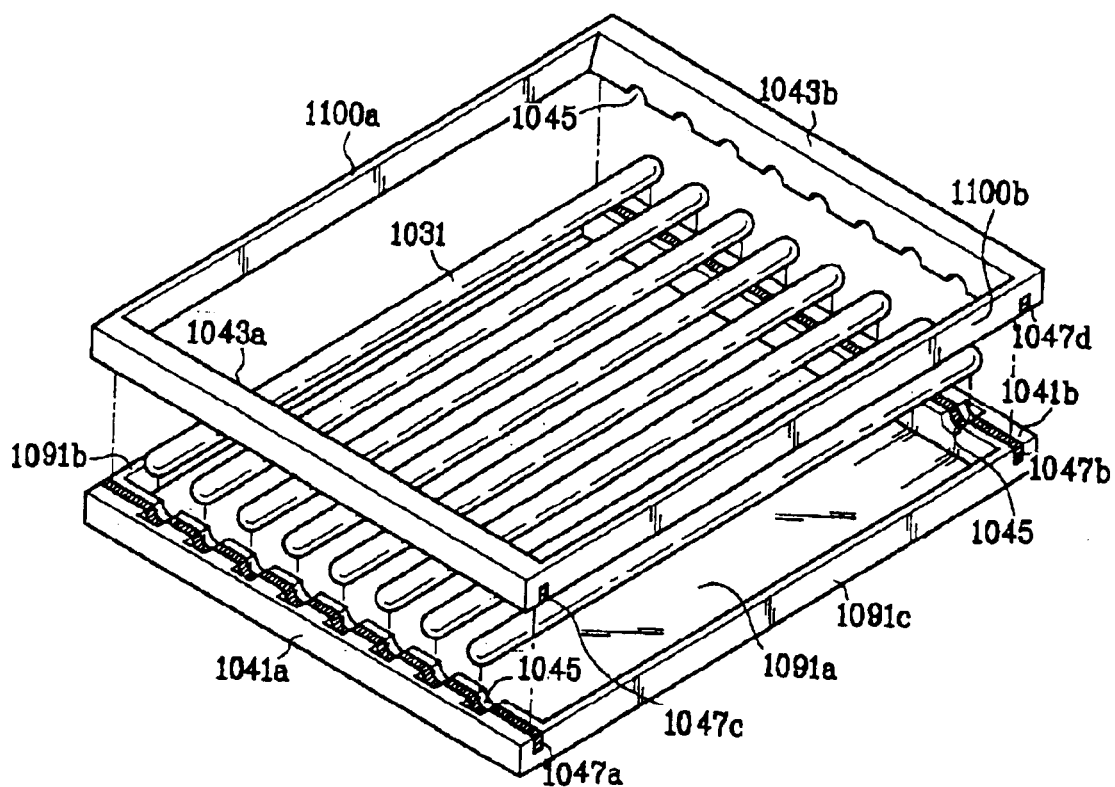
FIGS. 14A and 14B are perspective and cross-sectional views of another exemplary direct-type back light device according to the present invention.
Figure 14B:
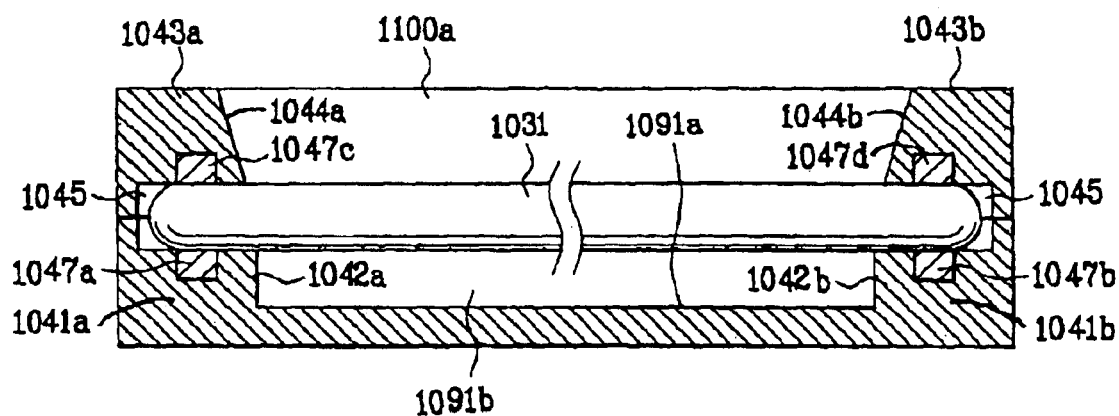

FIGS. 14A and 14B are perspective and cross-sectional views of another exemplary direct-type back light device according to the present invention. In FIG. 14A, the direct-type back light device may include a plurality of luminescent lamps 1031, a first lower support 1041a, a second lower support 1041b, a lower support plate 1091a, a first lower side rail support support 1091b, a second lower side rail support support 1091c, a first upper support 1043a corresponding to the first lower support 1041a, a second upper support 1043b corresponding to the second lower support 1041b, a first upper side rail support support 1100a, and a second upper side rail support support 1100b. Each of the plurality of luminescent lamps 1031 may include electrodes (not shown) formed inside the luminescent lamps 1031 at opposite ends, and may be arranged in parallel along a first direction, which is corresponds to a length direction of the luminescent lamps 1031, and spaced apart from each other by a first interval along a second direction perpendicular to the first direction. Alternatively, the luminescent lamps 1031 may include electrodes (not shown) formed along outside surfaces of the luminescent lamps 1031 at opposite ends of the luminescent lamps 1031.

The first lower support 1041a and the second lower support 1041b may be interconnected by the lower support plate 1091a, the first lower side rail support support 1091b, and the second lower side rail support support 1091c. The first lower support 1041a and the second lower support 1041b may be spaced apart from each other along the first direction by a constant interval that corresponds to a length of the luminescent lamps 1031.

The first upper support 1043a and the second upper support 1043b may be interconnected by the first upper side rail supportrail support support 1100a and the second upper side rail supportrail support support 1100b. The first upper support 1043a and the second upper support 1043b may be spaced apart from each other along the first direction by a constant interval that corresponds to a length of the luminescent lamps 1031.

In addition, the first and second lower supports 1041a and 1041b may include grooves 1045 for receiving first portions of the opposite ends of the luminescent lamps 1031. The first and second upper supports 1043a and 1043b may include grooves 1045 for receiving second portions of the opposite ends of the luminescent lamps 1031. Accordingly, the first and second lower supports 1041a and 1041b and the first and second upper supports 1043a and 1043b may secure the opposite ends of each of the luminescent lamps 1031. The grooves 1045 may be formed to partially pass through each of the first and second lower and upper supports 1041a, 1041b, 1043a, and 1043b so that the opposite ends of the luminescent lamps 1031 do not extend through the first and second lower and upper supports 1041a, 1041b, 1043a, and 1043b, thereby constraining each of the luminescent lamps 1031 along the first and second directions. In addition, each groove 1045 of the first and second lower supports 1041a and 1041b and the first and second upper supports 1043a and 1043b may have a depth corresponding to a radius of the luminescent lamps 1031.

The first lower support 1041a may include a conductive layer 1047a formed within a trench along a length direction of the first lower support 1041a. The second lower support 1041b may include a conductive layer 1047b formed within a trench along a length direction of the second lower support 1041b. The first upper support 1043a may include a conductive layer 1047c formed within a trench along a length direction of the first upper support 1043a. The second upper support 1043b may include a conductive layer 1047d formed within a trench along a length direction of the second upper support 1043b. The conductive layers 1047a, 1047b, 1047c, and 1047d supply power to the electrodes of the luminescent lamps 1031. Alternatively, the conductive layers 1047a and 1047b may be formed as an electrically conductive coating upon uppermost surfaces of the first and second lower supports 1041a and 1041b along the length directions, and the conductive layers 1047c and 1047d may be formed as an electrically conductive coating upon lowermost surfaces of the first and second upper supports 1043a and 1043b along the length directions. Accordingly, the electrically conductive coatings formed on the uppermost and lowermost surfaces of the first and second lower and upper supports 1041a, 1041b, 1043a, and 1043b may extend along side surfaces of the first and second lower and upper supports 1041a, 1041b, 1043a, and 1043b in order to make electrical contact to a connector (not shown).

In FIG. 14B, the first lower support 1041a may include a first surface 1042a that is normal to a surface of the luminescent lamp 1031, and the second lower support 1041b may include a second surface 1042b that is also normal to the surface of the luminescent lamp 1031. The first upper support 1043a may include a first inclined surface 1044a, and the second upper support 1043b may include a second inclined surface 1044b. The first and second inclined surfaces 1044a and 1044b may be inclined with respect to a line normal to a surface of the luminescent lamps 1031 by an angle θ that is within a range of about 10° to 30°. Accordingly, a thickness of the first and second upper supports 1043a and 1043b along the first direction may be less than a thickness of the first and second lower supports 1041a and 1041b along the first direction. Thus, a luminescent area of the plurality of luminescent lamps 1031 may be increased at a region corresponding to end portions of the luminescent lamps 1031.

In addition, the lower support plate 1091a, the first and second lower side rail supportrail support supports 1091b and 1091c, and the first and second upper side rail supportrail support supports 1100a and 1100b may be formed from a material that has a high light reflectivity so that inner surfaces of the lower support plate 1091a, the first and second lower side rail supportrail support supports 1091b and 1091c, and the first and second upper side rail supportrail support supports 1100a and 1100b function as reflecting plates. Alternatively, a coating may be applied to the inner surfaces of the lower support plate 1091a, the first and second lower side rail supportrail support supports 1091b and 1091c, and the first and second upper side rail supportrail support supports 1100a and 1100b to create highly reflective surfaces, thereby increasing scattering of light emitted by the luminescent lamps 1031.

In addition, a light scattering system (not shown) that may include a diffusion sheet and a diffusion plate, for example, may scatter light emitted from the luminescent lamps 1031. Accordingly, the light scattering system (not shown) may be arranged above the first and second upper supports 1043a and 1043b and first and second upper side rail support supports 1100a and 1100b so that the scattered light is uniformly distributed upon a display portion of an LCD panel.

Figure 15A:
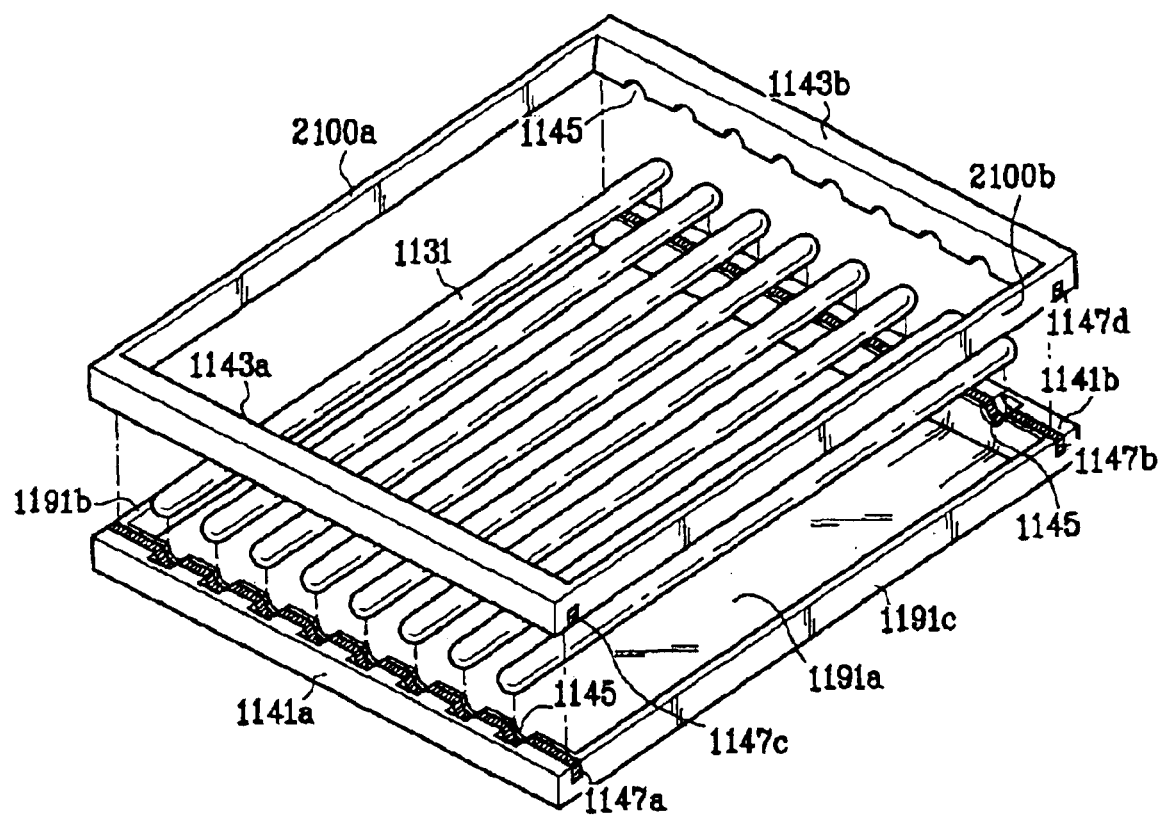
FIGS. 15A and 15B are perspective and cross-sectional views of another exemplary direct-type back light device according to the present invention.
Figure 15B:
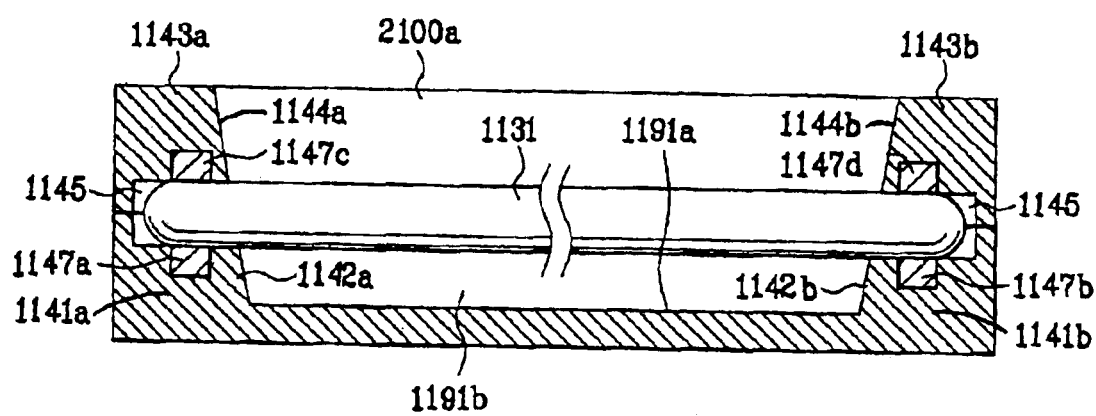

FIGS. 15A and 15B are perspective and cross-sectional views of another exemplary direct-type back light device according to the present invention. In FIG. 15A, the direct-type back light device may include a plurality of luminescent lamps 1131, a first lower support 1141a, a second lower support 1141b, a lower support plate 1191a, a first lower side rail support 1191b, a second lower side rail support 1191c, a first upper support 1143a corresponding to the first lower support 1141a, a second upper support 1143b corresponding to the second lower support 1141b, a first upper side rail support 2100a, and a second upper side rail support 2100b. Each of the plurality of luminescent lamps 1131 may include electrodes (not shown) formed inside the luminescent lamps 1131 at opposite ends, and may be arranged in parallel along a first direction, which is corresponds to a length direction of the luminescent lamps 1131, and spaced apart from each other by a first interval along a second direction perpendicular to the first direction. Alternatively, the luminescent lamps 1131 may include electrodes (not shown) formed along outside surfaces of the luminescent lamps 1131 at opposite ends of the luminescent lamps 1131.

The first lower support 1141a and the second lower support 1141b may be interconnected by the lower support plate 1191a, the first lower side rail support 1191b, and the second lower side rail support 1191c. The first lower support 1141a and the second lower support 1141b may be spaced apart from each other along the first direction by a constant interval that corresponds to a length of the luminescent lamps 1131.

The first upper support 1143a and the second upper support 1143b may be interconnected by the first upper side rail support 2100a and the second upper side rail support 2100b. The first upper support 1143a and the second upper support 1143b may be spaced apart from each other along the first direction by a constant interval that corresponds to a length of the luminescent lamps 1131.

In addition, the first and second lower supports 1141a and 1141b may include grooves 1145 for receiving first portions of the opposite ends of the luminescent lamps 1131. The first and second upper supports 1143a and 1143b may include grooves 1145 for receiving second portions of the opposite ends of the luminescent lamps 1131. Accordingly, the first and second lower supports 1141a and 1141b and the first and second upper supports 1143a and 1143b may secure the opposite ends of each of the luminescent lamps 1131. The grooves 1145 may be formed to partially pass through each of the first and second lower and upper supports 1141a, 1141b, 1143a, and 1143b so that the opposite ends of the luminescent lamps 1131 do not extend through the first and second lower and upper supports 1141a, 1141b, 1143a, and 1143b, thereby constraining each of the luminescent lamps 1131 along the first and second directions. In addition, each groove 1145 of the first and second lower supports 1141a and 1141b and the first and second upper supports 1143a and 1143b may have a depth corresponding to a radius of the luminescent lamps 1131.

The first lower support 1141a may include a conductive layer 1147a formed within a trench along a length direction of the first lower support 1141a. The second lower support 1141b may include a conductive layer 1147b formed within a trench along a length direction of the second lower support 1141b. The first upper support 1143a may include a conductive layer 1147c formed within a trench along a length direction of the first upper support 1143a. The second upper support 1143b may include a conductive layer 1147d formed within a trench along a length direction of the second upper support 1143b. The conductive layers 1147a, 1147b, 1147c, and 1147d supply power to the electrodes of the luminescent lamps 1131. Alternatively, the conductive layers 1147a and 1147b may be formed as an electrically conductive coating upon uppermost surfaces of the first and second lower supports 1141a and 1141b along the length directions, and the conductive layers 1147c and 1147d may be formed as an electrically conductive coating upon lowermost surfaces of the first and second upper supports 1143a and 1143b along the length directions. Accordingly, the electrically conductive coatings formed on the uppermost and lowermost surfaces of the first and second lower and upper supports 1141a, 1141b, 1143a, and 1143b may extend along side surfaces of the first and second lower and upper supports 1141a, 1141b, 1143a, and 1143b in order to make electrical contact to a connector (not shown).

In FIG. 15B, the first lower support 1141a may include a first inclined surface 1142a, and the second lower support 1141b may include a second inclined surface 1142b. The first upper support 1143a may include a first inclined surface 1144a, and the second upper support 1143b may include a second inclined surface 1144b. The first and second inclined surfaces 1142a and 1142b of the first and second lower supports 1141a and 1141b, and the first and second inclined surfaces 1144a and 1144b of the first and second upper supports 1143a and 1143b may be inclined with respect to lines normal to surfaces of the luminescent lamps 1131 by an angle θ that is within a range of about 10° to 30°. Accordingly, an uppermost thickness of the first and second upper supports 1143a and 1143b along the first direction may be less than an uppermost thickness of the first and second lower supports 1141a and 1141b along the first direction. Thus, a luminescent area of the plurality of luminescent lamps 1131 may be further increased at a region corresponding to end portions of the luminescent lamps 1131.

In addition, the lower support plate 1191, the first and second lower side rail supports 1191b and 1191c, and the first and second upper side rail supports 2100a and 2100b may be formed from a material that has a high light reflectivity so that inner surfaces of the lower support plate 1191a, the first and second lower side rail supports 1191b and 1191c, and the first and second upper side rail supports 2100a and 2100b function as reflecting plates. Alternatively, a coating may be applied to the inner surfaces of the lower support plate 1191a, the first and second lower side rail supports 1191b and 1191c, and the first and second upper side rail supports 2100a and 2100b to create highly reflective surfaces, thereby increasing scattering of light emitted by the luminescent lamps 1131.

In addition, a light scattering system (not shown) that may include a diffusion sheet and a diffusion plate, for example, may scatter light emitted from the luminescent lamps 1131. Accordingly, the light scattering system (not shown) may be arranged above the first and second upper supports 1143a and 1143b and first and second upper side rail supports 2100a and 2100b so that the scattered light is uniformly distributed upon a display portion of an LCD panel.

Figure 16A:
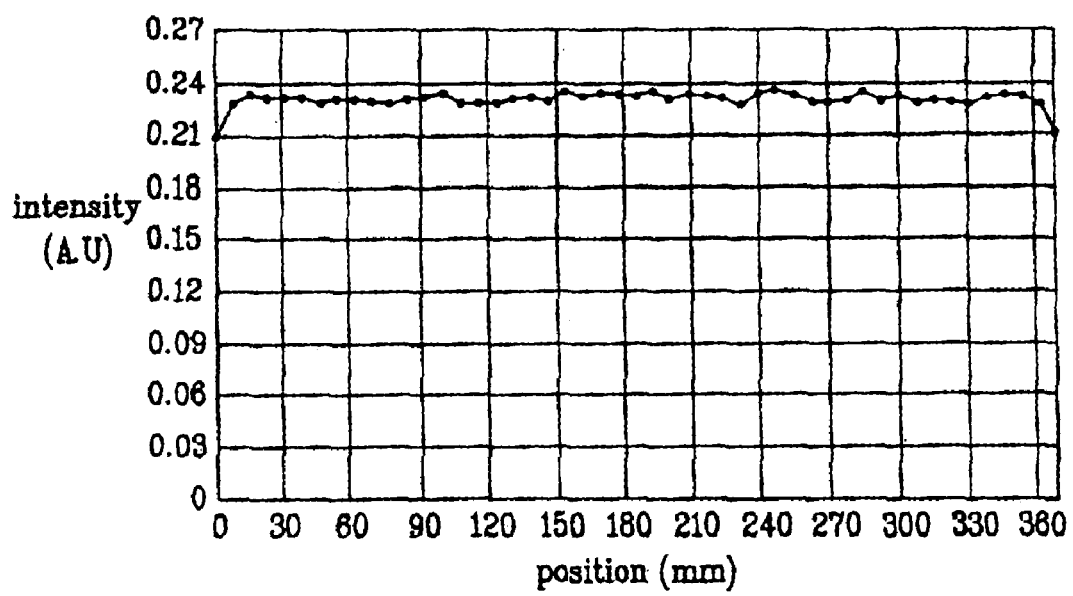
FIGS. 16A and 16B are graphs showing exemplary optical simulation results of a direct-type back light device manufactured in accordance with the present invention.
Figure 16B:
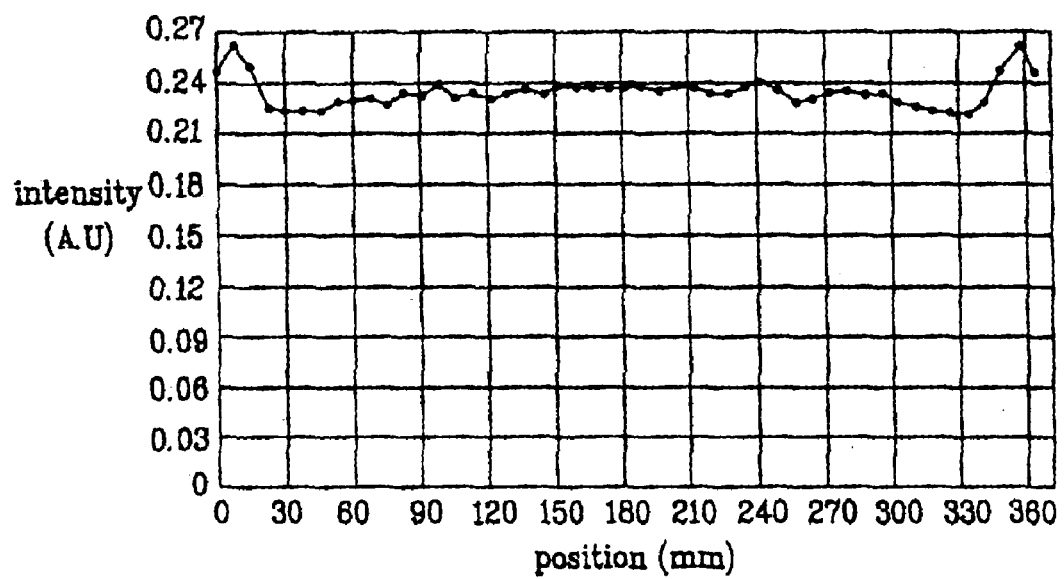

FIGS. 16A and 16B are graphs showing exemplary optical simulation results of a direct-type back light device manufactured in accordance with the present invention. FIG. 16A shows luminous intensity according to a relative position along a length direction of the luminescent lamps when the inclined angle of the inclined surfaces of the first and second upper supports according to the present invention is about 8°. FIG. 16B shows luminous intensity according to a relative position along the length of the luminescent lamps when the inclined angle of the inclined surfaces of the first and second upper supports according to the present invention is about 22°. Accordingly, FIGS. 16A and 16B demonstrate that the luminance intensity of the direct-type back light device is improved at the end portions of the luminescent lamps according to the inclined surfaces of the first and second upper supports.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A direct type back light device, comprising:
    a plurality of luminescent lamps, each having first and second opposite ends;
    first and second lower supports separated at a constant interval corresponding to a length of each of the luminescent lamps, the first and second lower supports each have a plurality of grooves for receiving one of the first and second opposite ends of the luminescent lamps to fix and support the luminescent lamps in parallel and conductive layers for supplying power to the luminescent lamps; and
    first and second upper supports formed to oppose the first and second lower supports, each of the first and second upper supports having grooves and conductive layers corresponding to the grooves and conductive layers of the first and second lower supports,
    wherein each of the first and second upper supports having an inclined inner surface.

2. The device according to claim 1, wherein each of the first and second lower supports have an inclined inner surface.

3. The device according to claim 2, wherein each of the inclined inner surfaces of the first and second lower supports form an angle with respect to an axis normal to a surface of the luminescent lamps within a range of about 10° to 30°.

4. The device according to claim 1, wherein each of the inclined inner surfaces of the first and second upper supports form an angle with respect to an axis normal to a surface of the luminescent lamps within a range of about 10° to 30°.

5. The device according to claim 1, wherein the grooves are formed to completely pass through the first and second lower and upper supports.

6. The device according to claim 1, wherein the grooves are formed to partially pass through the first and second lower and upper supports.

7. The device according to claim 1, wherein the conductive layers of the first and second lower and upper supports are formed of a conductive material disposed in a trench formed along a length direction of each of the first and second lower and upper supports.

8. The device according to claim 1, wherein the conductive layers of the first and second lower and upper supports are formed of a coating of a conductive material on an area where each of the first and second pluralities of grooves of each of the first and second lower and upper supports are formed.

9. The device according to claim 1, further comprising a lower support plate, a lower side rail support formed between the first and second lower supports.

10. The device according to claim 9, wherein the lower support plate and the lower side rail support include a light reflecting material.

11. The device according to claim 9, wherein the lower support plate and the lower side rail support include a coating of a reflecting material on an interior surface of the lower support plate and the lower side rail support.

12. The device according to claim 1, further comprising an upper side rail support formed to connect with opposing end portions of the first and second upper supports.

13. The device according to claim 1, further comprising a light scattering system formed above the first and second upper supports.

14. The device according to claim 1, wherein each of the luminescent lamps include electrodes formed on an exterior surface at the first and second opposite ends of the luminescent lamp.

15. The device according to claim 1, wherein the luminescent lamps include electrodes formed on an interior surface at the first and second opposite ends of the luminescent lamp.

16. A direct-type back light device, comprising:
   a plurality of luminescent lamps, each having first and second opposite ends;
   first and second lower supports separated at a constant interval corresponding to a length of the luminescent lamps, the first and second lower supports each have a first plurality of grooves for receiving one of the first and second opposite ends of the luminescent lamps to fix and support the luminescent lamps;
   first and second lower side rail supports formed between the first and second lower supports to fix and support the first and second lower supports;
   first and second upper supports formed to oppose the first and second lower supports, each of the first and second upper supports arranged at the constant interval to fix and support the luminescent lamps together with the first and second lower supports and each of the first and second upper supports have inclined interior surfaces and a second plurality of grooves; and
   conductive layers formed on surfaces of the first and second pluralities of grooves to apply a power source to each of the luminescent lamps.

17. The device according to claim 16, wherein the inclined interior surfaces of the first and second upper supports are formed at an angle within a range of about 10° to about 30° from a vertical line normal to a surface of the luminescent lamps.

18. The device according to claim 16, wherein the first and second lower supports have inclined interior surfaces.

19. The device according to claim 18, wherein the inclined interior surfaces of the first and second lower supports are formed at an angle within a range of about 10° to about 30° from a vertical line normal to a surface of the luminescent lamps.

20. The device according to claim 16, wherein the first and second pluralities of grooves completely pass through the first and second lower and upper supports.

21. The device according to claim 16, wherein the first and second pluralities of grooves partially pass through the first and second lower and upper supports.

22. The device according to claim 16, wherein the conductive layers of the first and second lower and upper supports are formed of a conductive material disposed in a trench formed along a length direction of each of the first and second lower and upper supports.

23. The device according to claim 16, wherein the conductive layers of the first and second lower and upper supports are formed of a coating of a conductive material on an area where each of the first and second pluralities of grooves of each of the first and second lower and upper supports are formed.

24. The device according to claim 16, wherein the first and second lower side rail supports include a light reflecting material.

25. The device according to claim 16, wherein the first and second lower side rail supports include a coating of a reflecting material on an interior surface of the first and second lower side rail supports.

26. The device according to claim 16, further comprising first and second upper side rail supports formed between opposing ends of the first and second upper supports.

27. The device according to claim 16, wherein the first and second lower and upper supports are separable from each other.

28. The device according to claim 16, further comprising a light scattering system formed above the first and second upper supports.

29. The device according to claim 16, wherein each of the luminescent lamps include electrodes formed on an exterior surface at the first and second opposite ends of the luminescent lamps.

30. The device according to claim 16, wherein each of the luminescent lamps include electrodes formed on an interior surface at the first and second opposite ends of the luminescent lamps.

31. The device according to claim 16, further comprising a lower support plate formed between the first and second lower supports.

* * * * *